(12) United States Patent
Watanabe et al.

(10) Patent No.: US 12,065,115 B2
(45) Date of Patent: Aug. 20, 2024

(54) BRAKE CONTROL APPARATUS

(71) Applicant: Hitachi Astemo, Ltd., Hitachinaka (JP)

(72) Inventors: Asahi Watanabe, Hitachinaka (JP);
Toshiya Oosawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 434 days.

(21) Appl. No.: 17/618,226

(22) PCT Filed: May 28, 2020

(86) PCT No.: PCT/JP2020/021057
§ 371 (c)(1),
(2) Date: Dec. 10, 2021

(87) PCT Pub. No.: WO2020/250695
PCT Pub. Date: Dec. 17, 2020

(65) Prior Publication Data
US 2022/0324430 A1    Oct. 13, 2022

(30) Foreign Application Priority Data

Jun. 13, 2019    (JP) ................. 2019-110175

(51) Int. Cl.
*B60T 17/22*    (2006.01)
*B60T 11/26*    (2006.01)

(52) U.S. Cl.
CPC ............. *B60T 17/225* (2013.01); *B60T 11/26* (2013.01); *B60T 17/221* (2013.01); *B60T 2270/402* (2013.01)

(58) Field of Classification Search
CPC ...... B60T 17/225; B60T 17/221; B60T 11/26; B60T 2270/402; B60T 17/18; B60T 13/686; B60T 17/22; B60T 2270/413
See application file for complete search history.

(56) References Cited

U.S. PATENT DOCUMENTS

| | | | |
|---|---|---|---|
| 10,046,744 B2 * | 8/2018 | Oosawa | B60T 8/94 |
| 2016/0082937 A1 | 3/2016 | Nakaoka et al. | |
| 2017/0050629 A1 * | 2/2017 | Kim | B60T 13/662 |
| 2018/0370509 A1 * | 12/2018 | Yagashira | B60T 8/409 |
| 2019/0184958 A1 * | 6/2019 | Watanabe | B60T 8/48 |

FOREIGN PATENT DOCUMENTS

WO    WO 2014/184840 A1    11/2014

OTHER PUBLICATIONS

International Search Report (PCT/ISA/210) issued in PCT Application No. PCT/JP2020/021057 dated Aug. 18, 2020 with English translation (five (5) pages).
Japanese-language Written Opinion (PCT/ISA/237) issued in PCT Application No. PCT/JP2020/021057 dated Aug. 18, 2020 with English translation (six (6) pages).

* cited by examiner

*Primary Examiner* — Pamela Rodriguez
(74) *Attorney, Agent, or Firm* — Crowell & Moring LLP

(57) ABSTRACT

A second control unit controls a pump of a P system and a pump of an S system according to a stroke of a brake pedal that is detected by a stroke sensor in a state that a fluid level of brake fluid in a reservoir tank falls below a predetermined fluid surface level.

13 Claims, 9 Drawing Sheets

BRAKE CONTROL APPARATUS

TECHNICAL FIELD

The present invention relates to a brake control apparatus.

BACKGROUND ART

PTL 1 discloses a brake control apparatus including two hydraulic pressure controllers capable of controlling a wheel cylinder hydraulic pressure in a fluid passage that connects a master cylinder and a wheel cylinder. A first hydraulic pressure controller includes a first actuator for regenerative cooperative brake control and a first ECU that controls the first actuator. A second hydraulic pressure controller includes a second actuator for maintaining stability of the vehicle and a second ECU that controls the second actuator. When a failure has occurred in the first hydraulic pressure controller, the second ECU actuates the second actuator according to a brake operation amount, thereby securing a braking force.

CITATION LIST

Patent Literature

PTL 1: International Publication No. 2014-184840

SUMMARY OF INVENTION

Technical Problem

However, the brake control apparatus discussed in the above-described patent literature, PTL 1 discloses nothing about when an outward leak of the brake fluid has occurred, thereby leaving room for improvement.

An object of the present invention is to provide a brake control apparatus capable of securing a braking force by one of systems even when an outward leak of brake fluid has occurred.

Solution to Problem

In a brake control apparatus according to one aspect of the present invention, a second control unit controls a primary-system second hydraulic pressure source and a secondary-system second hydraulic pressure source according to a physical amount regarding an operation amount of a brake pedal that is detected by a brake operation amount detection portion in a state that a fluid level of brake fluid in a reservoir tank falls below a predetermined fluid surface level.

Advantageous Effects of Invention

Therefore, according to the one aspect of the present invention, the brake control apparatus can secure the braking force by one of the systems even when the outward leak of the brake fluid has occurred.

DESCRIPTION OF EMBODIMENTS

First Embodiment

Figure 1:
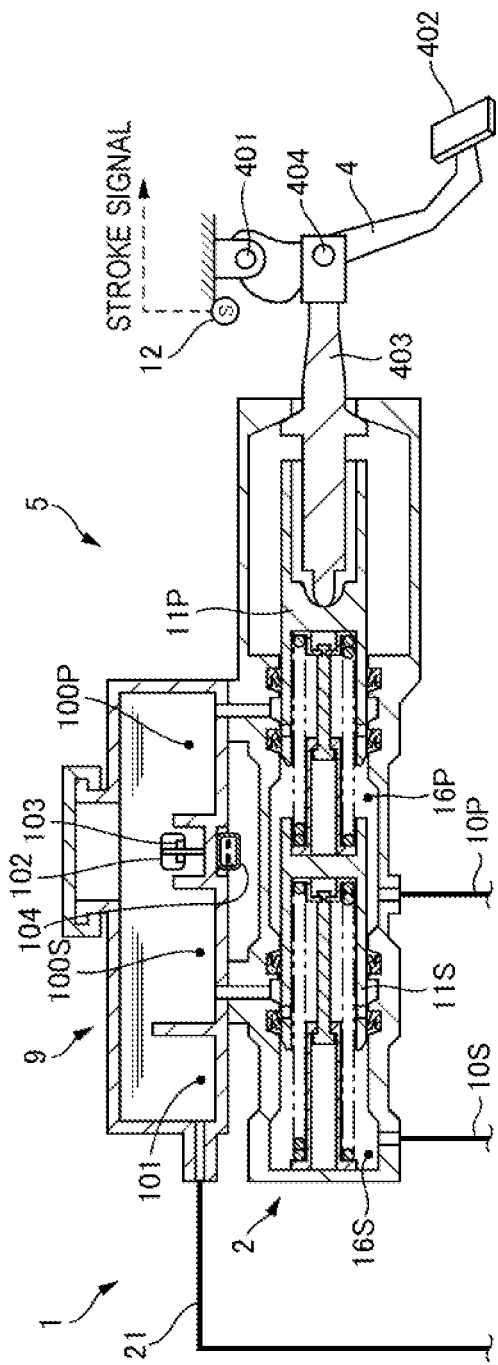
FIG. 1 illustrates the configuration of a master cylinder unit 5 in a brake control apparatus 1 according to a first embodiment.
Figure 2:
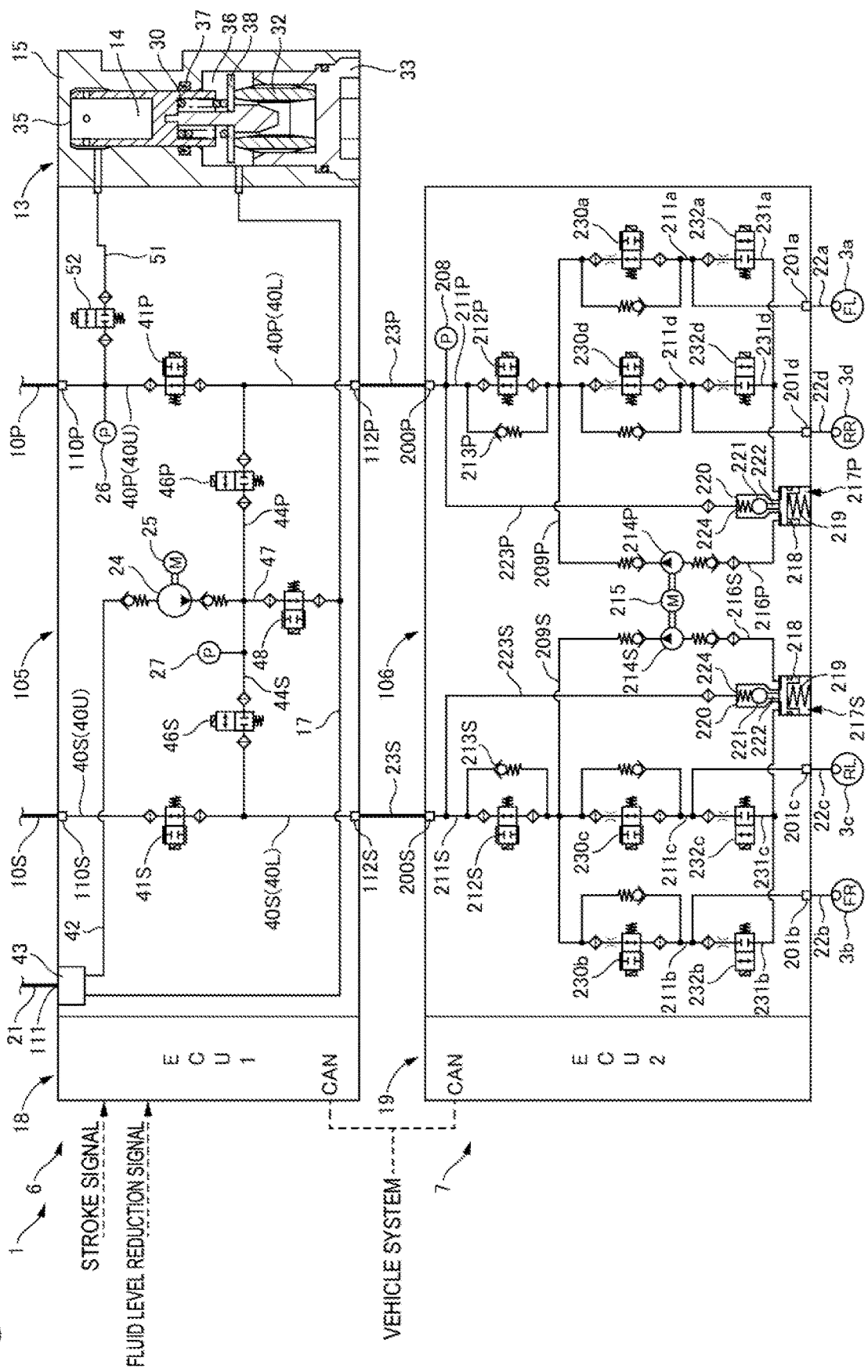
FIG. 2 illustrates the configurations of a first unit 6 and a second unit 7 in the brake control apparatus 1 according to the first embodiment.

FIG. 1 illustrates the configuration of a master cylinder unit 5 in a brake control apparatus 1 according to a first embodiment. FIG. 2 illustrates the configurations of a first unit 6 and a second unit 7 in the brake control apparatus 1 according to the first embodiment.

The brake control apparatus 1 is applied to an electric vehicle. Examples of the electric vehicle include an electric automobile using a motor as a power source that drives wheels, and a hybrid vehicle that uses an internal combustion engine and a motor as the power source. The brake control apparatus 1 can also be applied to a vehicle using only an internal combustion engine as the power source. At each portion illustrated in FIGS. 1 and 2, P placed at the end of the reference numeral indicates that this portion corresponds to a primary system (a P system) of a master cylinder 2. S placed at the end of the reference numeral indicates that this portion corresponds to a secondary system (an S system) of the master cylinder 2. Hereinafter, when the P and S systems are not distinguished from each other, the indexes P and S will be omitted. Further, a placed at the end of the reference numeral indicates that this portion corresponds to a front left wheel FL. Similarly, b placed at the end, c placed at the end, and d placed at the end indicate that these portions correspond to a front right wheel FR, a rear left wheel RL, and a rear right wheel RR, respectively. When these wheels FL to RR are not distinguished from one another, the indexes a, b, c, and d will be omitted.

The brake control apparatus 1 generates a brake hydraulic pressure in a wheel cylinder 3 (a wheel cylinder hydraulic pressure) using a hydraulic brake, thereby pressing brake pads mounted on each of the wheels FL to RR against a brake disk mounted on the wheel side and applying a braking force to each of the wheels FL to RR.

A brake pedal 4 is a brake operation member that receives an input of a driver's brake operation. The brake pedal 4 is a so-called suspended-type brake pedal, and the proximal end of the pedal is supported rotatably by a shaft 401. One end of a push rod 403 is connected rotatably via a shaft 404 to the proximal end side of the brake pedal 4 between the shaft 401 and a pad 402.

The brake control apparatus 1 includes the master cylinder unit 5, a first unit 6, and a second unit 7.

The master cylinder unit 5 is a unit in which the master cylinder 2 and a reservoir tank 9 are integrally provided.

The master cylinder 2 is actuated by an operation performed by the driver on the brake pedal 4 (the brake operation), and generates a brake hydraulic pressure (a master cylinder hydraulic pressure) according to an amount of the brake operation. The master cylinder 2 does not include a negative-pressure booster that boosts or amplifies the force of the driver's brake operation (the force pressing the brake pedal 4) by utilizing, for example, an intake negative pressure of the engine. The master cylinder 2 is connected to the brake pedal 4 via the push rod 403, and is also replenished with the brake fluid from the reservoir tank 9. The master cylinder 2 is a tandem-type master cylinder, and includes a primary piston 11P and a secondary piston 11S in series as master cylinder pistons axially movable according to the brake operation. The primary piston 11P is connected to the push rod 403. The secondary piston 11S is configured as a free piston.

The reservoir tank 9 is a brake fluid source storing the brake fluid therein, and is a low-pressure portion opened to the atmospheric pressure. The inside of the reservoir tank 9 is partitioned by partition walls into three sections. A primary tank chamber (a first storage chamber) 100P supplies the brake fluid to a primary chamber (a first chamber) 16P of the master cylinder 2. A secondary tank chamber (a second storage chamber) 100S supplies the brake fluid to a secondary chamber (a second chamber) 16S of the master cylinder 2. A suction tank chamber (a third storage chamber) 101 is connected to an internal fluid pool chamber 43 of a first hydraulic pressure unit 105, which will be described below, via a suction hose 21. The brake control apparatus 1 includes a float 102, a magnet 103, and a fluid level switch (a fluid level detection portion) 104 as a unit that detects the fluid surface level of the brake fluid stored in the reservoir tank 9. The float 102 is provided inside the reservoir tank 9. The float 102 is a material having lower specific gravity than the brake fluid, and is lifted/lowered in conjunction with the fluid surface by floating on the fluid surface of the brake fluid. The magnet 103 is fixed to a lower portion of the float 102. The fluid level switch 104 is installed on the outer side of the reservoir tank 9 and below the float 102. The fluid level switch 104 is a reed switch that is switched on/off according to the strength of a magnetic force. The fluid level switch 104 detects a reduction in the fluid level by being switched from ON to OFF due to the magnetic force of the magnet 103 when the fluid level reduces and the magnet 103 approaches thereto, and outputs a fluid level reduction signal to a first control unit 18. The first control unit 18 is connected to the fluid level switch 104 via a dedicated electric wire.

A stroke sensor 12 is provided on the brake pedal 4. The stroke sensor 12 is a brake operation amount detection portion, and detects a displacement amount of the brake pedal 4 (a pedal stroke) as a physical amount regarding an operation amount of the brake pedal 4 (a brake operation amount). For example, a rotational angle sensor capable of detecting the angle of the brake pedal 4 is used as the stroke sensor 12, and the stroke sensor 12 determines the pedal stroke based on the relationship between the detected angle and the pedal length of the brake pedal 4. Alternatively, a sensor that detects an axial displacement of the push rod 403 may be used as the stroke sensor 12, and the pedal stroke sensor 12 may determine the pedal stroke based on the axial displacement and the pedal ratio of the brake pedal 4. Now, the pedal ratio is a ratio according to the "principle of leverage", and the pedal stroke is determined by assuming that the shaft 401 of the brake pedal 4, the brake pad 402, and the connection shaft 404 of the push rod 403 are a fulcrum, a point of effort, and a point of load, respectively. The stroke sensor 12 may be provided in the master cylinder 2, and the displacement of the push rod 403 may be measured.

The first unit 6 is a unit in which a stroke simulator 13, the first hydraulic pressure unit 105, and the first control unit 18 are integrally provided.

The stroke simulator 13 is actuated according to the driver's brake operation. The primary piston 11P of the master cylinder 2 is moved according to the driver's brake operation, and the brake fluid pushed out by that flows into the stroke simulator 13, by which the pedal stroke is generated. The inside of the stroke simulator 13 is divided into two chambers, a positive pressure chamber 35 and a backpressure chamber 36, and a simulator piston 14 is inserted in a cylinder portion formed inside a simulator casing 15. The simulator piston 14 is sealed by a cup seal 37. The cup seal 37 permits only a flow of the brake fluid in a direction from the backpressure chamber 36 to the positive pressure chamber 35, and prohibits a flow of the brake fluid in a direction from the positive pressure chamber 35 to the backpressure chamber 36. Therefore, a pressure for moving the simulator piston 14 is generated in the positive pressure chamber 35 due to an inflow from the master cylinder 2 side into the stroke simulator 13. A spring member 30 and a rubber member 32 are held in the backpressure chamber 36 with use of a retainer 38 and a plug 33. Therefore, when the simulator piston 14 is displaced, the spring member 30 and the rubber member 32 are compressed, by which a reaction force is generated. As a result, due to the establishment of balance between the pressure in the positive pressure chamber 35 and the reaction force generated due to the compression of the spring member 30 and the rubber member 32, a natural pedal feeling is generated.

The first hydraulic pressure unit 105 is connected to the master cylinder 2 via master cylinder pipes 10. Further, the first hydraulic pressure unit 105 is connected to the suction tank chamber 101 of the reservoir tank 9 via the suction hose 21. The first hydraulic pressure unit 105 and the second hydraulic pressure unit 106 are connected to each other via unit connection pipes 23. The second hydraulic pressure unit 106 is connected to the wheel cylinders 3 via wheel cylinder pipes 22. The brake control apparatus 1 employs a so-called X (cross) piping configuration, in which the primary system of the second hydraulic pressure unit 106 is connected to the front left-wheel wheel cylinder 3a and the rear right-wheel wheel cylinder 3d while the secondary system is connected to the front right-wheel wheel cylinder 3b and the rear left-wheel wheel cylinder 3c.

The first hydraulic pressure unit 105 includes first input ports 110, a suction port 111, and first output ports 112. A first input port of the P system (a primary-system first input port) 110P is connected to a master cylinder pipe 10P. A first input port of the S system (a secondary-system first input port) 110S is connected to a master cylinder pipe 10S. The suction port 111 is connected to the suction hose 21. A first output port of the P system (a primary-system first output port) 112P is connected to a unit connection pipe 23P. A first output port of the S system (a secondary-system first output port) 112S is connected to a unit connection pipe 23S. The first input port 110P and the first output port 112P of the P system are connected to each other via a first connection fluid passage (a primary-system first connection fluid passage) 40P. The first input port 110S and the first output port 112S of the S system are connected to each other via a first connection fluid passage (a secondary-system first connection fluid passage) 40S. Shut-off valves 41 are provided in the first connection fluid passages 40. The shut-off valves 41 are normally-opened (kept in a valve-opened state when no electric power is supplied thereto) proportional control valves. A shut-off valve (a primary-system shut-off valve) 41P is provided in the first connection fluid passage 40P, and a shut-off valve (a secondary-system shut-off valve) 41S is provided in the first connection fluid passage 40S. Each of the first connection fluid passages 40 is divided into an upstream-side fluid passage 40U on the master cylinder 2 side and a downstream-side fluid passage 40L on the wheel cylinder 3 side by the shut-off valve 41.

A hydraulic pressure sensor 26 is provided in the upstream-side fluid passage 40U of the P system. The hydraulic pressure sensor 26 detects the master cylinder hydraulic pressure. A simulator fluid passage 51 branches off from the upstream-side fluid passage 40U of the P system. The simulator fluid passage 51 is connected to the positive pressure chamber 35 of the stroke simulator 13. A simulator valve 52 is provided in the simulator fluid passage 51. The simulator valve 52 is a normally-closed (kept in a valve-closed state when no electric power is supplied thereto) ON/OFF valve.

The downstream-side fluid passage 40L of the P system and the downstream-side fluid passage 40L of the S system are connected to each other via communication fluid passages 44. The communication fluid passages 44 include a communication fluid passage (a primary-system first discharge fluid passage) 44P connected to the downstream-side fluid passage 40L of the P system, and a communication fluid passage (a secondary-system first discharge fluid passage) 44S connected to the downstream-side fluid passage 40L of the S system. Communication valves 46 are provided in the communication fluid passages 44. The communication valves 46 are normally-closed ON/OFF valves. A hydraulic pressure sensor 27 is provided in the communication fluid passage 44S of the S system. The hydraulic pressure sensor 27 detects the discharge pressure of a pump 24 (a first hydraulic pressure source).

The first hydraulic pressure unit 105 includes the pump 24 and a motor 25 serving as a driving source thereof. The pump 24 is a plunger pump. The motor 25 is, for example, a brushless motor. The flow rate of the pump 24 can be adjusted by controlling the number of rotations of the motor 25. An intake fluid passage 42 is connected to the intake side of the pump 24. The intake fluid passage 42 is connected to the internal fluid pool chamber 43. The internal fluid pool chamber 43 is connected to the suction hose 21 at the suction port 111, and receives supply of the brake fluid from the reservoir tank 9. The internal fluid pool chamber 43 has a predetermined volume, and allows the brake fluid to be continuously supplied to the pump 24 due to the brake fluid contained in the internal fluid pool chamber 43 even when, for example, a leak failure has occurred in the suction hose 21 and the supply of the brake fluid cannot be received from the reservoir tank 9. The output side of the pump 24 is connected to the communication fluid passages 44.

The communication fluid passages 44 are connected to a pressure reduction fluid passage 47. The pressure reduction fluid passage 47 is further connected to a return flow fluid passage 17. The return flow fluid passage 17 is a low-pressure portion opened to the atmospheric pressure, and is connected to the internal fluid pool chamber 43. A pressure adjustment valve 48 is provided in the pressure reduction fluid passage 47. The pressure adjustment valve 48 is a normally-opened proportional control valve.

The first control unit 18 is an electronic control unit (ECU) that controls the first hydraulic pressure unit 105. The first control unit 18 is connected to the stroke sensor 12 via a dedicated electric wire (an electric power source line, a ground line, and a signal line). The first control unit 18 calculates a target wheel cylinder hydraulic pressure according to the pedal stroke detected by the stroke sensor 12. For example, the relationship between the pedal stroke and the target wheel cylinder hydraulic pressure is stored in the form of a table in advance, and the target wheel cylinder hydraulic pressure is determined according to the value detected by the stroke sensor 12. Further, the first control unit 18 controls each of the electromagnetic valves and the motor 25 in the first hydraulic pressure unit 105. For example, the first control unit 18 actuates the shut-off valves 41 in the valve-closing directions to thus block the flow of the brake fluid in the master cylinder 2 according to the driver's brake operation, and also actuates the simulator valve 52 in the valve-opening direction to thus guide the brake fluid in the master cylinder 2 to the stroke simulator 13, thereby creating a pedal stroke and an appropriate reaction force.

On the other hand, when detecting the generation of the target wheel cylinder hydraulic pressure according to the driver's brake operation, the first control unit 18 drives the motor 25 to actuate the pump 24, and, at the same time, actuates the communication valves 46 in the valve-opening directions and the pressure adjustment valve 48 in the valve-closing direction, thereby causing the brake fluid transmitted out by the pump 24 to flow from the communication fluid passages 44 to the first connection fluid passages 40. At this time, since the shut-off valves 41 are closed, the brake fluid flows into the unit connection pipes 23 and flows into each of the wheel cylinders 3 via the second hydraulic pressure unit 106, thereby generating the wheel cylinder hydraulic pressure. In this case, the communication fluid passages 44 are in the connected states, and form one system of hydraulic pressure circuit. Therefore, all of the wheel cylinder hydraulic pressures are adjusted to the same pressure, and therefore the wheel cylinder hydraulic pressures can be measured by the hydraulic pressure sensor 27. The first control unit 18 controls the inflow amount of the brake fluid into the wheel cylinders 3 with use of the number of rotations of the motor 25 according to hydraulic pressure feedback using the hydraulic pressure sensor 27. At the same time, the first control unit 18 adjusts the outflow amount by adjusting the opening degree of the pressure adjustment valve 48 to cause the brake fluid to flow to the pressure reduction fluid passage 47 side. Therefore, the first control unit 18 can arbitrarily increase/reduce the brake fluid amount to be supplied to the wheel cylinders 3, thereby realizing wheel cylinder hydraulic pressure control aiming at causing the wheel cylinder hydraulic pressure to match the target wheel cylinder hydraulic pressure.

Further, the first connection fluid passages 40, which connect the brake pedal 4 and the wheel cylinders 3, are each divided into the upstream-side fluid passage 40U and the downstream-side fluid passage 40L by the shut-off valve 41, and this configuration can realize a so-called brake-by-wire state, in which no change occurs on the brake pedal 4 at all even when the wheel cylinder hydraulic pressure is arbitrarily adjusted. The target wheel cylinder hydraulic pressure is not dependent only on the pedal stroke. A request for autonomous brake (for example, collision reduction brake and adaptive cruise control) is issued from the vehicle system, and a request for control of frictional brake is issued from a regenerative cooperative brake function. A communication unit is provided in the first control unit 18 to input these requests via the vehicle side and a CAN (control area network).

The second unit 7 is a unit in which a second hydraulic pressure unit 106 and a second control unit 19 are integrally provided.

The second hydraulic pressure unit 106 can control the wheel cylinder hydraulic pressures in the P system and the S system independently with use of the brake fluid flowing in from the unit connection pipes 23. Further, the second hydraulic pressure unit 106 can control the brake hydraulic pressure in each of the wheel cylinders 3a to 3d independently. The second hydraulic pressure unit 106 according to the first embodiment is configured similarly to a brake control apparatus used in a commonly-used electric stability controller (ESC).

The second hydraulic pressure unit 106 includes second input ports 200 and second output ports 201. A second input port of the P system (a primary-system second input port) 200P is connected to the unit connection pipe 23P. A second input port of the S system (a secondary-system second input port) 200S is connected to the unit connection pipe 23S. The second output ports 201 are connected to the wheel cylinder pipes 22. The second input port 200P of the P system is connected to a second connection fluid passage (a primary-system second connection fluid passage) 211P. The second input port 200S of the S system is connected to a second connection fluid passage (a secondary-system second connection fluid passage) 211S. The second connection fluid passage 211P of the P system branches into a second connection fluid passage 211a and a second connection fluid passage 211d, and is connected to second output ports (a primary-system second output port) 201a and 201d. The second connection fluid passage 211S of the S system branches into second connection fluid passages 211b and 211c, and is connected to second output ports (a secondary-system second output port) 201b and 201c. A gate valve (a primary-system gate valve) 212P is provided in the second connection fluid passage 211P of the P system. A gate valve (a secondary-system gate valve) 212S is provided in the second connection fluid passage 211S of the S system. Check valves 213 are provided in the second connection fluid passages 211 in parallel with the gate valves 212. The check valves 213 each permit only a flow of the brake fluid in a direction from the second input port 200 to the second output port 201, and prohibit a flow of the brake fluid in a direction from the second output port 201 to the second input port 200.

Pressure increase valves 230a to 230d are provided in the second connection fluid passages 211a to 211d, respectively. The pressure increase valves 230a to 230d are normally-opened proportional control valves. Pressure reduction fluid passages 231a to 231d are connected to the second output port 201a to 201d sides of the second connection fluid passages 211a to 211d with respect to the pressure increase valves 230a to 230d, respectively. The pressure reduction fluid passages 231a and 231d are connected to a reservoir 217P after being merged. The pressure reduction fluid passages 231b and 231c are connected to a reservoir 217S after being merged. Communication valves 232 are provided in the pressure reduction fluid passages 231. The communication valves 232 are normally-closed ON/OFF valves. A hydraulic pressure sensor 208 is provided on the second input port 200P side of the second connection fluid passage 211P of the P system with respect to the gate valve 212P. The hydraulic pressure sensor 208 detects a hydraulic pressure at this position.

The second hydraulic pressure unit 106 includes a P-system pump (a primary-system second hydraulic pressure source) 214P and an S-system pump (a secondary-system second hydraulic pressure pump) 214S, and a motor 215 serving as the driving source of them. Both the pump 214P and the pump 214S are plunger pumps. The motor 215 is, for example, a brushless motor. The flow rates of the pump 214P and the pump 214S can be adjusted by controlling the number of rotations of the motor 215. Intake fluid passages 216 are connected to the intake sides of the pumps 214. The intake fluid passages 216 are connected to the reservoirs 217. The discharge side of the pump 214P of the P system is connected to a discharge fluid passage (a primary-system second discharge fluid passage) 209P. The discharge side of the pump 214S of the S system is connected to a discharge fluid passage (a secondary-system second discharge fluid passage) 209S. The discharge fluid passage 209P of the P system is connected to the second output port 201a and 201d side of the second connection fluid passage 211P with respect to the gate valve 212P. The discharge fluid passage 209S of the S system is connected to the second output port 201b and 201c side of the second connection fluid passage 211S with respect to the gate valve 212S.

The reservoirs 217 each include a reservoir piston 218, a reservoir spring 219, and a check valve 220. The reservoir piston 218 is provided so as to be able to conduct a vertical stroke inside the reservoir 217. The reservoir piston 218 is moved downward and upward according to an increase and a reduction in the brake fluid amount flowing into the reservoir 217, respectively. The reservoir spring 219 biases the reservoir piston 218 in the upward direction. The check valve 220 includes a ball valve 221 and a valve seat 222. The ball valve 221 is provided integrally with the reservoir piston 218, and is vertically moved according to the stroke of the reservoir piston 218. The ball valve 221 is biased by a valve spring 24 in the downward direction. The elastic force of the valve spring 224 is set to a weaker force than the elastic force of the reservoir spring 219. The valve seat 222 abuts against the ball valve 221 when the ball valve 221 is moved downward. The other sides of the check valves 220 are connected to intake connection fluid passages 223. The intake connection fluid passages 223 are connected to the second input port 200 sides of the second connection fluid passages 211 with respect to the gate valves 212. Further, the reservoirs 217 are connected to pressure reduction fluid passages 231. The reservoirs 217 store the brake fluid flowing off from the wheel cylinders 3 into the pressure reduction fluid passages 231. The brake fluid stored in the reservoirs 217 is returned to the second connection fluid passages 211 by the actuation of the pumps 214.

The second control unit 19 is an electronic control unit (ECU) that controls the second hydraulic pressure unit 106. The second control unit 19 calculates a vehicle behavior state based on values detected by a wheel speed sensor mounted on each of the wheels FL to RR, a longitudinal acceleration sensor, a yaw rate sensor, and the like. For example, the second control unit 19 performs ABS control if a currently braked wheel has a lock tendency and performs ECS control if the vehicle is in a sideslip state as a result of the calculation of the vehicle behavior state. For example, in the ABS control, the second control unit 19 calculates the target wheel cylinder hydraulic pressure for resolving the lock tendency of the wheel targeted for the control and actuates the second hydraulic pressure unit 106 in such a manner that the wheel cylinder hydraulic pressure matches the target wheel cylinder hydraulic pressure.

The second control unit 19 includes a communication unit for outputting the calculated vehicle behavior state to the vehicle side via the CAN. The first control unit 18 and the second control unit 19 transmit and receive data via the CAN.

Then, the second control unit 19 does not include a hydraulic pressure sensor that actually measures the wheel cylinder hydraulic pressure, and therefore should estimate the wheel cylinder hydraulic pressure to cause the wheel cylinder hydraulic pressure to follow the target wheel cylinder hydraulic pressure in the ABS control or the ECS control. One example thereof will be described now.

For example, when the first hydraulic pressure unit 105 is not in operation, such as when the driver does not operate the brake pedal 4, the hydraulic pressures at the second input ports 200 are zero. Suppose that, from this state, the ECS control is performed based on the result of the calculation of the vehicle behavior state and the same target wheel cylinder hydraulic pressure is generated on the four wheels to slow down the vehicle. The second control unit 19 drives the motor 215 to actuate the pumps 214P and 214S of both the systems, and, at the same time, actuates the gate valves 212P and 212S in the valve-closing directions. The subsequent description will continue focusing on the P system. The brake fluid is supplied to the pump 214P via the intake connection fluid passage 223P, the reservoir 217P, and the intake fluid passage 216, and is discharged from the pump 214P to the second connection fluid passage 211. Since the gate valve 212P is in the valve-closed state, the brake fluid flows from the second connection fluid passage 211 to each of the second connection fluid passage 211a of the front left wheel FL and the second connection fluid passage 211d of the rear right wheel RR, and can increase the pressure in each of the wheel cylinder 3a on the front left wheel FL and the wheel cylinder 3d on the rear right wheel RR. The wheel cylinder hydraulic pressure at this time can be estimated based on the brake fluid amount transmitted into the wheel cylinder 3a on the front left wheel FL and the wheel cylinder 3d on the rear right wheel RR. The brake fluid amount transmitted into the wheel cylinder 3a on the front left wheel FL and the wheel cylinder 3d on the rear right wheel RR can be estimated by calculating the pump flow rate based on the number of rotations of the motor 215 and integrating it. The brake fluid amount and the wheel cylinder hydraulic pressure are correlated, and a conversion from the brake fluid amount into the hydraulic pressure (the pressure) is also possible. Therefore, the wheel cylinder hydraulic pressure can be estimated. The same also applies to the S system (the front right wheel FR and the rear left wheel RL). The wheel cylinder hydraulic pressure control by the second hydraulic pressure unit 106 utilizes the estimation calculation of the wheel cylinder hydraulic pressure, and therefore is less accurate than the wheel cylinder hydraulic pressure control by the first hydraulic pressure unit 105, which can feed back the actual wheel cylinder hydraulic pressure with use of the hydraulic pressure sensor 27.

Next, the operation of the brake control apparatus 1 according to the first embodiment will be described.

(Normal Brake Control) Normal brake control refers to brake control that generates appropriate deceleration according to the pedal stroke generated by the driver's brake operation. In the normal brake control, the brake control apparatus 1 performs boosting control that assists the brake operation by generating a brake hydraulic pressure by which the driver's brake pressing force is insufficient. The normal brake control is realized by the operation of the first hydraulic pressure unit 105. The first control unit 18 converts the signal output from the stroke sensor 12 into the pedal stroke, and calculates the target wheel cylinder hydraulic pressure according to the pedal stroke. The first control unit 18 realizes the wheel cylinder hydraulic pressure control by actuating each of the electromagnetic valves and the motor 25 in the first hydraulic pressure unit 105 according to the target wheel cylinder hydraulic pressure, and using the value detected by the hydraulic pressure sensor 27 for the feedback. At the same time, the stroke simulator 13 is actuated and generates a natural pedal feeling, and therefore the driver can acquire a comfortable braking feeling.

(Autonomous Brake Control) Autonomous brake control refers to brake control that generates deceleration in reaction to a request from the vehicle system with no brake operation input by the driver. The autonomous brake control is realized by the operation of the first hydraulic pressure unit 105. The first control unit 18 calculates the target wheel cylinder hydraulic pressure to realize a target value of the autonomous brake input via the CAN. The target value of the autonomous brake may be any physical amount regarding braking, such as an acceleration and a deceleration of the vehicle. The first control unit 18 realizes the wheel cylinder hydraulic pressure control by actuating each of the electromagnetic valves and the motor 25 in the first hydraulic pressure unit 105 according to the target wheel cylinder hydraulic pressure, and using the value detected by the hydraulic pressure sensor 27 for the feedback.

(Backup Control When Failure Has Occurred in First Unit) Backup control refers to control that the second unit 7 substitutes to perform the brake hydraulic pressure control when a failure has occurred in the first unit 6 and makes it impossible to perform the normal brake control or the autonomous brake control. An example expected as the failure in the first unit 6 is a failure that makes the control impossible mainly due to a malfunction in the electronic system, such as short-circuiting of the valve solenoid in the first hydraulic pressure unit 105, a malfunction of the hydraulic pressure sensor 26 or 27 or a malfunction of the motor driving function, and a malfunction of the calculation function in the first control unit 18. Another expected example is a mechanical failure such as a leak of the brake fluid in the first hydraulic pressure unit 105. The first control unit 18 includes a unit that detects the above-described failure in the first unit, and takes a safety action such as causing the system to transition to a fallback or stop the operation according to a fail-safe when the failure is detected. When detecting the failure in the first unit 6, the first control unit 18 transmits this failure information to the second control unit 19 via the CAN. Further, the first control unit 18 de-actuates the first hydraulic pressure unit 105 (stops the electric power supply to all of the electromagnetic valves and the motor 25).

When detecting the failure in the first unit 6 via the CAN, the second control unit 19 performs the backup control. In the backup control, the second control unit 19 calculates the target wheel cylinder hydraulic pressure according to the value detected by the hydraulic pressure sensor 208 instead of the value detected by the stroke sensor 12. The reason therefor is that the stroke sensor 12 is connected only to the first control unit 18 and therefore the second control unit 19 cannot receive the value detected by the stroke sensor 12 when a power shutdown, a failure in the communication unit, or the like has occurred in the first control unit 18. One conceivable solution for avoiding that is to connect the stroke sensor 12 to the second control unit 19. However, this solution additionally necessitates a dedicated electric wire (an electric power source line, a ground line, and a signal line) connecting the stroke sensor 12 and the second control unit 19, and further necessitates the establishment of electric independence from the dedicated electric wire connecting the stroke sensor 12 and the first control unit 18, thereby leading to an increase in the size of the system.

On the other hand, when the failure has occurred in the first unit 6, the first hydraulic pressure unit 105 is brought into a de-actuated state, and therefore the brake fluid output from the primary chamber 16P and the brake fluid output from the secondary chamber 16S of the master cylinder 2 pass through the first connection fluid passage 40P and the first connection fluid passage 40S of the first hydraulic pressure unit 105, respectively, and flow into the second hydraulic pressure unit 106 when the driver operates the brake pedal 4. In other words, when the first unit 6 is in the de-actuated state, the value detected by the hydraulic pressure sensor 208 increases due to the inflow of the master cylinder hydraulic pressure according to the brake operation force into the second hydraulic pressure unit 106, so that the second control unit 19 can acquire the operation state of the brake pedal 4 based on the value detected by the hydraulic pressure sensor 208. Further, the second hydraulic pressure unit 106 has the function of controlling the wheel cylinder hydraulic pressures by actuating the respective pumps 214P and 214S of the two systems according to the target wheel cylinder hydraulic pressure, and therefore can generate the braking force requested by the driver even when the failure has occurred in the first unit 6.

Regarding the autonomous brake control, the second control unit 19 can receive a deceleration request from the vehicle system via the CAN, and therefore can conduct the autonomous brake by the second unit 7 during the backup control.

Using different electric power sources for the first unit 6 and the second unit 7 can reduce the possibility that both the units 6 and 7 have failed at the same time to almost zero, and therefore the concept of the backup is satisfied provided that a failure state is monitored at both the units 6 and 7 and the driver is warned when one of them has failed. In this manner, even when a failure has occurred in the first unit 6 and the first unit 6 becomes unable to perform the normal brake control and the autonomous brake control, the backup control can be realized by the second unit 7.

(Brake Control When Fluid Level Reduces) When the brake fluid stored in the reservoir tank 9 reduces, the fluid level switch 104 transmits a fluid level reduction signal to the first control unit 18. When receiving the fluid level reduction signal, the first control unit 18 de-actuates the first hydraulic pressure unit 105 and transmits fluid level reduction information to the second control unit 19 via the CAN. Further, the first control unit 18 transmits the pedal stroke to the second control unit 19 via the CAN. The second control unit 19 calculates the target wheel cylinder hydraulic pressure according to the received pedal stroke and performs the wheel cylinder hydraulic pressure control based on the target wheel cylinder hydraulic pressure.

The signal of the fluid level switch 104 does not necessarily have to be directly input to the first control unit 18, and the brake control apparatus 1 may be configured in such a manner that the signal of the fluid level switch 104 is input to another control unit and is transmitted to the first control unit 18 and the second control unit 19 via the CAN.

Next, the respective processing procedures regarding the brake control by the first control unit 18 and the second control unit 19 will be described in detail.

Figure 3:
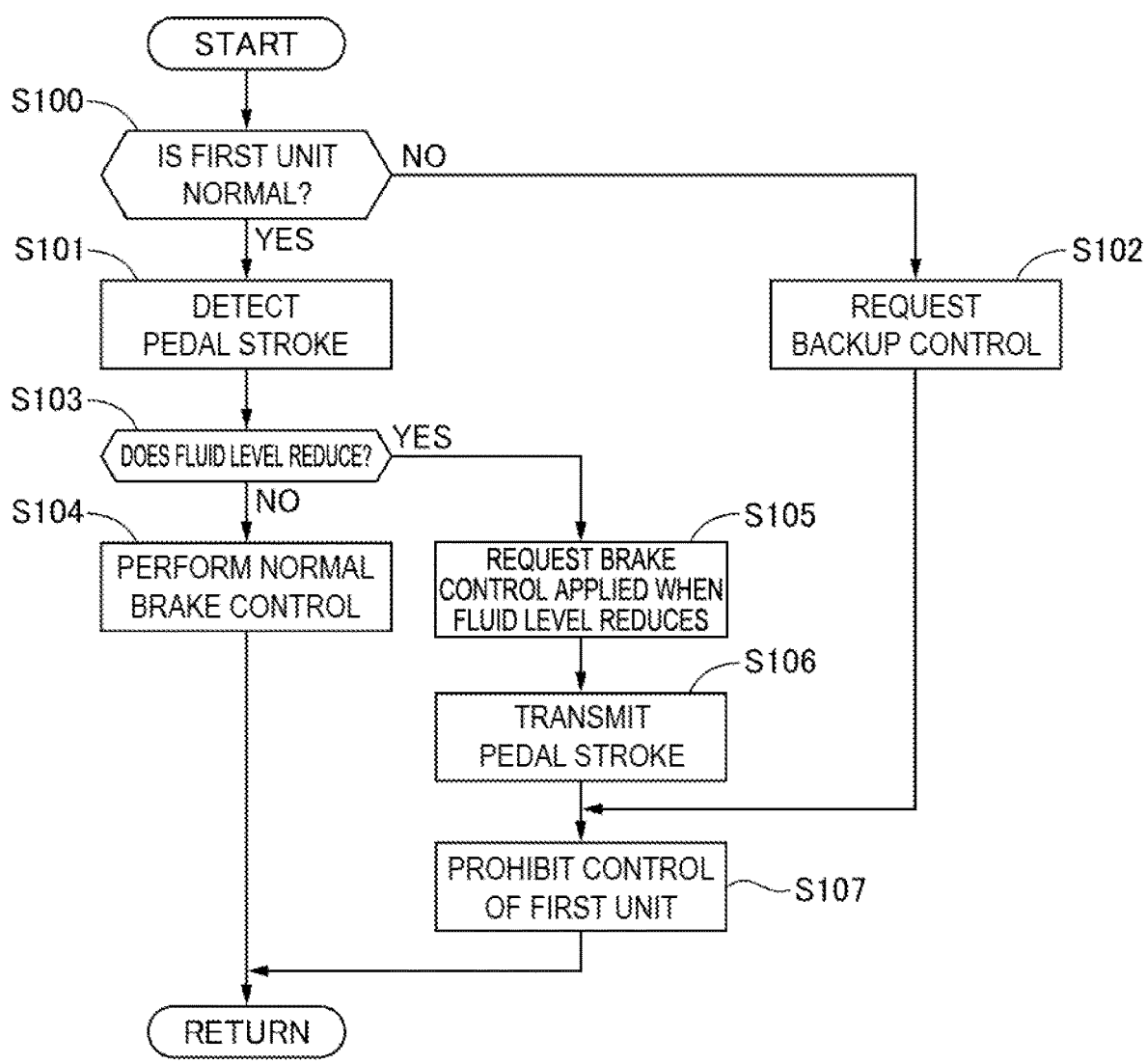
FIG. 3 is a flowchart illustrating a flow of brake control processing by a first control unit 18 according to the first embodiment.
Figure 4:
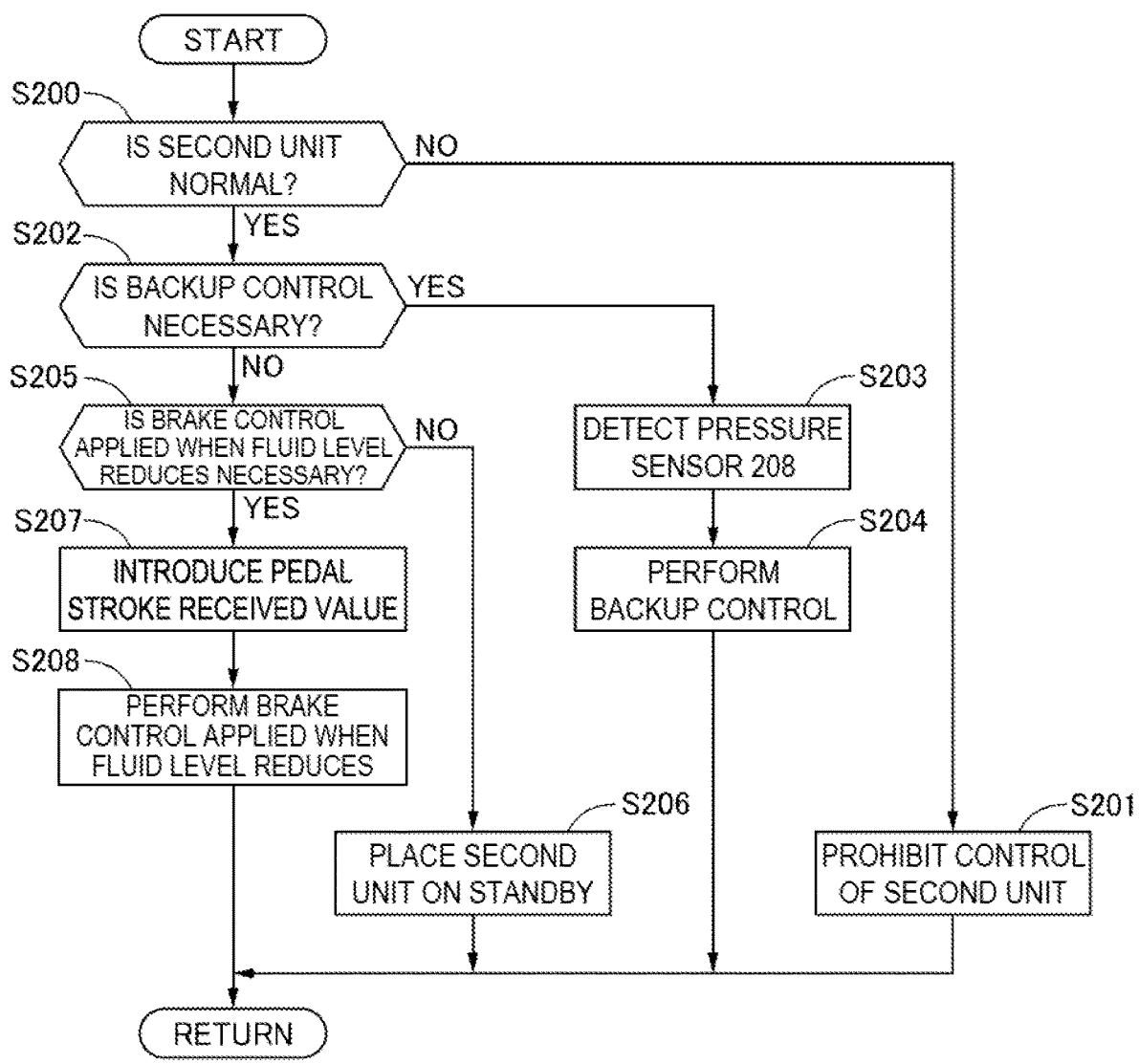
FIG. 4 is a flowchart illustrating a flow of brake control processing by a second control unit 19 according to the first embodiment.

FIG. 3 is a flowchart illustrating a flow of the brake control processing by the first control unit 18 according to the first embodiment, and FIG. 4 is a flowchart illustrating a flow of the brake control processing by the second control unit 19 according to the first embodiment. These processing procedures are performed repeatedly per predetermined calculation cycle, but are not synchronized between the first control unit 18 and the second control unit 19 and are in operation independently of each other.

In step S100 in FIG. 3, the first control unit 18 determines whether the first unit 6 is normal, i.e., a failure is undetected in the first unit 6. If the determination in step S100 is YES, the processing proceeds to step S101. If the determination in step S100 is NO, the processing proceeds to step S102.

In step S101, the first control unit 18 detects the pedal stroke using the stroke sensor 12.

In step S102, the first control unit 18 performs processing for requesting the backup control. More specifically, the first control unit 18 transmits the failure information to the second control unit 19 via the CAN.

In step S103, the first control unit 18 determines whether the fluid level of the brake fluid stored in the reservoir tank 9 reduces, i.e., the fluid level reduction signal is input from the fluid level switch 104. If the determination in step S103 is YES, the processing proceeds to step S105. If the determination in step S103 is NO, the processing proceeds to step S104.

In step S104, the first control unit 18 performs the normal brake control. More specifically, the first control unit 18 calculates the target wheel cylinder hydraulic pressure according to the pedal stroke and performs the wheel cylinder hydraulic pressure control in such a manner that the value detected by the hydraulic pressure sensor 27 matches the target wheel cylinder hydraulic pressure.

In step S105, the first control unit 18 issues a request for the brake control applied when the fluid level reduces. More specifically, the first control unit 18 transmits the fluid level reduction information to the second control unit 19 via the CAN.

In step S106, the first control unit 18 transmits the pedal stroke to the second control unit 19 via the CAN.

In step S107, the first control unit 18 prohibits the control of the first unit 6. More specifically, the first control unit 18 de-actuates all of the electromagnetic valves 41, 46, 48, and 52 and the motor 25 in the first hydraulic pressure unit 105.

In step S200 in FIG. 4, the second control unit 19 determines whether the second unit 7 is normal, i.e., a failure is undetected in the second unit 7. If the determination in step S200 is YES, the processing proceeds to step S202. If the determination in step S200 is NO, the processing proceeds to step S201.

In step S201, the second control unit 19 prohibits the control of the second unit 7. More specifically, the second control unit 19 de-actuates all of the electromagnetic valves 212, 230, and 232 and the motor 215 in the second hydraulic pressure unit 106.

In step S202, the second control unit 19 determines whether the backup control is necessary. If the determination in step S202 is YES, the processing proceeds to step S203. If the determination in step S202 is NO, the processing proceeds to step S205. In this step, the second control unit 19 determines that the backup control is unnecessary if the communication with the first control unit 18 is normal and no request for the backup control is received as a result of the communication. It is further preferable to determine whether the communication is normal by providing two communication units independent of each other and transmitting pieces of information supposed to have the same content via two paths and comparing them, because the determination can be made further accurately in this case.

In step S203, the second control unit 19 detects (calculates) the brake operation amount based on the value detected by the hydraulic pressure sensor 208.

In step S204, the second control unit 19 performs the backup control. More specifically, the second control unit 19 calculates the target wheel cylinder hydraulic pressure according to the brake operation amount determined based on the value detected by the hydraulic pressure sensor 208, and performs the wheel cylinder hydraulic pressure control in such a manner that the estimated value of the wheel cylinder hydraulic pressure estimated based on the number of rotations of the motor 215 matches the target wheel cylinder hydraulic pressure.

In step S205, the second control unit 19 determines whether the brake control applied when the fluid level reduces is necessary. If the determination in step S205 is YES, the processing proceeds to step S207. If the determination in step S205 is NO, the processing proceeds to step S206. In this step, the second control unit 19 determines that the brake control applied when the fluid level reduces is necessary if the request for the brake control applied when the fluid level reduces is issued from the first control unit 18.

In step S206, the second control unit 19 places the second unit 7 on "standby". The "standby" refers to a state of performing the wheel cylinder hydraulic pressure control based on the result of the calculation of the vehicle behavior, which is a main function of the second unit 7, or waiting for an instruction. Therefore, the second hydraulic pressure unit 7 is placed on "standby" if the entire brake control apparatus 1 operates normally.

In step S207, the second control unit 19 introduces the pedal stroke received value received from the first control unit 18 via the CAN. The pedal stroke received value refers to a result of the reception of the request transmitted from the first control unit 18 (the data transmitted in step S106).

In step S208, the second control unit 19 performs the brake control applied when the fluid level reduces. More specifically, the second control unit 19 calculates the target wheel cylinder hydraulic pressure according to the pedal stroke, and performs the wheel cylinder hydraulic pressure control in such a manner that the estimated value of the wheel cylinder hydraulic pressure estimated based on the number of rotations of the motor 215 matches the target wheel cylinder hydraulic pressure.

The operation of the brake control apparatus 1 according to the first embodiment allows the braking force to be secured for each portion expected to have an outward leak of the brake fluid, the details of which will be described next.
(Outward Leak from around P-system Wheel Cylinder)
Portions expected to have an outward leak of the brake fluid around the wheel cylinders 3a and 3d of the P system include the wheel cylinders 3a and 3d (a defect in the pipe joint, the fluid seeping at the air removal bleeder, deterioration of the wheel cylinder itself, a defect in the seal, and the like), the wheel cylinder pipes 22a and 22d (damage of the pipe, a defect in the joint, and the like), and the second output ports 201a and 201d (a defect in the joint and the like).

When an outward leak of the brake fluid has occurred from around the wheel cylinder 3a or 3d of the P system, the brake fluid introduced into the P system of the second hydraulic pressure unit 106 via the suction tank chamber 101 of the reservoir tank 9→the suction hose 21→the pump 24→the communication valve 46P→the unit connection pipe 23P flows off outward from the brake leak portion when the brake control is performed. If the leak has occurred while the vehicle is running, the brake fluid flows off each time the brake control is performed and the fluid level reduces in the reservoir tank 9, and therefore the fluid level switch 104 is actuated (switched on). On the other hand, when the brake control is out of operation, the brake fluid flows into the second hydraulic pressure unit 106 via the primary tank chamber 100P of the reservoir tank 9→the primary chamber 16P of the master cylinder 2→the master cylinder pipe 10P→the first connection fluid passage 40P→the unit connection pipe 23P, and flows off from the brake leak portion outward due to own weight of the brake fluid. If the brake fluid continues flowing off via this route, the brake fluid in the P system may be depleted and air may enter the fluid passages.

On the other hand, because the brake fluid does not flow off from the S system outward in both the cases, the brake fluid remains in each of the fluid passages 16S, 10S, 40S, and 23S subsequent to the secondary tank chamber 100S of the reservoir tank 9 and the S system in the second hydraulic pressure unit 106. The reduction in the fluid level of the brake fluid in the reservoir tank 9 is detected based on the signal of the fluid level switch 104, and triggers the brake control processing procedures illustrated in FIGS. 3 and 4. The first control unit 18 transmits the pedal stroke acquired by the stroke sensor 12 to the second control unit 19, and the second control unit 19 performs the wheel cylinder hydraulic pressure control based on the received pedal stroke. As a result, the pressures in the wheel cylinders 3b and 3c of the S system can be increased with use of the brake fluid remaining in the S system.

When the outward leak of the brake fluid has occurred from around the wheel cylinder 3a or 3d of the P system, the signal of the hydraulic pressure sensor 208 cannot be used because air may enter each of the fluid passages of the P system. More specifically, because almost no pressure is generated in each of the fluid passages of the P system due to the air, the hydraulic pressure sensor 208 does not function as the unit for detecting the brake operation amount. Therefore, the second control unit 19 inputs the pedal stroke from the first control unit 18 as the brake operation amount and performs the wheel cylinder hydraulic pressure control according to the target wheel cylinder hydraulic pressure based on the pedal stroke. Then, another conceivable solution is to directly connect the second control unit 19 and the stroke sensor 12, but this solution necessitates new additions of an electric power source line, a ground line, and a signal line and also requires the stroke sensor 12 to satisfy the internal independence, thus leading to the complication of the system. Therefore, the brake control apparatus 1 can reliably acquire the braking force even when the outward leak of the brake fluid has occurred while constructing the system simply by employing the configuration in which the second control unit 19 receives the pedal stroke via the CAN.
(Outward Leak from around S-system Wheel Cylinder)
Portions expected to have an outward leak of the brake fluid around the wheel cylinders 3b and 3c of the S system include the wheel cylinders 3b and 3c (a defect in the pipe joint, the fluid seeping at the air removal bleeder, deterioration of the wheel cylinder itself, a defect in the seal, and the like), the wheel cylinder pipes 22b and 22c (damage of the pipe, a defect in the joint, and the like), and the second output ports 201b and 201cc (a defect in the joint and the like).

When an outward leak of the brake fluid has occurred from around the wheel cylinder 3b or 3c of the S system, the brake fluid introduced into the S system of the second hydraulic pressure unit 106 via the suction tank chamber 101 of the reservoir tank 9→the suction hose 21→the pump 24→the communication valve 46S→the unit connection pipe 23S flows off from the brake leak portion when the brake control is performed. If the leak has occurred while the vehicle is running, the brake fluid flows off each time the brake control is performed and the fluid level reduces in the reservoir tank 9, and therefore the fluid level switch 104 is actuated (switched on). On the other hand, when the brake control is out of operation, the brake fluid flows into the S-system of the second hydraulic pressure unit 106 via the secondary tank chamber 100S of the reservoir tank 9→the secondary chamber 16S of the master cylinder 2→the master cylinder pipe 10S→the first connection fluid passage 40S→the unit connection pipe 23S, and then flows off from the brake leak portion outward. If the brake fluid continues flowing off via this route, the brake fluid in the S system may be depleted and air may enter the fluid passages.

On the other hand, because the brake fluid does not flow off from the P system in both the cases, the brake fluid remains in each of the fluid passages 16P, 10P, 40P, and 23P subsequent to the primary tank chamber 100P of the reservoir tank 9 and the P system in the second hydraulic pressure unit 106. The reduction in the fluid level of the brake fluid in the reservoir tank 9 is detected based on the signal of the fluid level switch 104, and triggers the brake control processing procedures illustrated in FIGS. 3 and 4. The first control unit 18 transmits the pedal stroke determined based on the signal output from the stroke sensor 12 to the second control unit 19, and the second control unit 19 performs the wheel cylinder hydraulic pressure control based on the received pedal stroke. As a result, the pressures in the wheel cylinders 3a and 3d of the P system can be increased with use of the brake fluid remaining in the P system.

When the outward leak of the brake fluid has occurred from around the wheel cylinder 3b or 3c of the S system, no air enters each of the fluid passages of the P system and therefore the pressures in each of the fluid passages of the P system are increased with the aid of the pressure generated in the primary chamber 16P of the master cylinder 2. However, when air enters the S system, the secondary chamber 16S with no pressure generated therein is compressed and is accompanied by a full stroke of the secondary piston 11S (a movement until the secondary piston 11S abuts against the master cylinder 2) and the primary chamber 16P is not compressed during that in the master cylinder 2, which leads to such a situation that the pedal stroke is greater and the signal of the hydraulic pressure sensor 208 detects the pressure on a deeper side compared to when the operation is normal without the brake fluid leaking outward. Therefore, the pressure of the P system detected by the hydraulic pressure sensor 208 is inappropriate as the physical amount corresponding to the brake operation amount. Therefore, the brake operation amount can be correctly recognized by employing the configuration in which the second control unit 19 receives the pedal stroke via the CAN.

(Outward Leak from around Unit Connection Pipe) Portions expected to have an outward leak of the brake fluid around the unit connection pipes 23 connecting the first hydraulic pressure unit 105 and the second hydraulic pressure unit 106 include the unit connection pipes 23 (damage of the pipe), the first output ports 112 (a defect in the joint), and the second input ports 200 (a defect in the joint). In the following description, only the operation when an outward leak has occurred around the unit connection pipe 23P on the P system side will be described because the operation would be the same between the P system and the S system if being considered with the systems put the other way around.

When the outward leak of the brake fluid has occurred from around the unit connection pipe 23P, the brake fluid transmitted from the suction tank chamber 101 of the reservoir tank 9→the suction hose 21→the pump 24→the communication valve 46P→the unit connection pipe 23P flows off outward when the brake control is performed. On the other hand, when the brake control is out of operation, the brake fluid flows via the primary tank chamber 100P of the reservoir tank 9→the primary chamber 16P of the master cylinder 2→the master cylinder pipe 10P→the first connection fluid passage 40P→the unit connection pipe 23P, and flows off from the brake leak portion outward due to own weight of the brake fluid. If the brake fluid continues flowing off via this route, the brake fluid in the P system (the upstream side of the unit connection pipe 23P) may be depleted and air may enter the fluid passages.

On the other hand, because the brake fluid does not flow off from the S system in both the cases, the brake fluid remains in each of the fluid passages 16S, 10S, 40S, and 23S subsequent to the secondary tank chamber 100S of the reservoir tank 9 and the S system in the second hydraulic pressure unit 106. The reduction in the fluid level of the brake fluid in the reservoir tank 9 is detected based on the signal of the fluid level switch 104, and triggers the brake control processing procedures illustrated in FIGS. 3 and 4. The first control unit 18 transmits the pedal stroke determined based on the signal output from the stroke sensor 12 to the second control unit 19, and the second control unit 19 performs the wheel cylinder hydraulic pressure control based on the received pedal stroke. As a result, the pressures in the wheel cylinders 3b and 3c of the S system can be increased with use of the brake fluid remaining in the S system. The brake fluid also remains in the P system of the second hydraulic pressure unit 106 but remains only by a small amount, and therefore air is supposed to be sucked in from the leak portion at the moment that the pump 214P of the second hydraulic pressure unit 106 is actuated, resulting in a failure to increase the pressures in the wheel cylinders 3a and 3d of the P system. Therefore, the braking force of the S system according to the pedal stroke can be secured when the fluid leak has occurred around the unit connection pipe 23P.

(Outward Leak from around Master Cylinder Pipe) Portions expected to have an outward leak of the brake fluid around the master cylinder pipes 10 connecting the master cylinder 2 and the first hydraulic pressure unit 105 include the master cylinder pipes 10 (damage of the pipe), the output ports of the master cylinder 2 (a defect in the joint), and the first input ports 110 (a defect in the joint). In the following description, only the operation when an outward leak has occurred around the master cylinder pipe 10P on the P system side will be described because the operation would be the same between the P system and the S system if being considered with the systems put the other way around.

When an outward leak of the brake fluid has occurred from around the master cylinder pipe 10P, the brake fluid transmitted from the primary tank chamber 100P→the primary chamber 16P→the master cylinder pipe 10P flows off outward regardless of whether the brake control is in operation or out of operation. Therefore, the brake fluid in the primary tank chamber 100P may be depleted and air may enter the fluid passages. When the brake control is in operation, the shut-off valve 41P is closed and the brake fluid sucked from the suction tank chamber 101 and discharged by the pump 24 does not flow off outward. The same also applies to the S system. The reduction in the fluid level of the brake fluid in the reservoir tank 9 is detected based on the signal of the fluid level switch 104, and triggers the brake control processing procedures illustrated in FIGS. 3 and 4. The first control unit 18 transmits the pedal stroke determined based on the signal output from the stroke sensor 12 to the second control unit 19, and the second control unit 19 performs the wheel cylinder hydraulic pressure control based on the received pedal stroke. As a result, the pressures in the wheel cylinders 3b and 3c of the S system can be increased with use of the brake fluid remaining in the S system. The brake fluid also remains in the P system of the first hydraulic pressure unit 105 and the second hydraulic pressure unit 106 but remains only by a small amount, and therefore air is supposed to be sucked in from the leak portion at the moment that the pump 214P of the second hydraulic pressure unit 106 is actuated, resulting in a failure to increase the pressures in the wheel cylinders 3a and 3d of the P system. Therefore, the braking force of the S system according to the pedal stroke can be secured when the fluid leak has occurred around the master cylinder pipe 10P.

(Outward Leak from around Suction Hose) Portions expected to have an outward leak of the brake fluid around the suction hose 21 connecting the suction tank chamber 101 of the reservoir tank 9 and the first hydraulic pressure unit 105 include the suction hose 21 (damage of the hose or the pipe), the output port of the suction chamber 101 in the reservoir tank 9 (a defect in the joint), and the suction port 111 (a defect in the joint).

When an outward leak of the brake fluid has occurred from around the suction hose 21, the brake fluid transmitted from the suction tank chamber 101→the suction hose 21 flows off outward and the brake fluid in the suction tank chamber 101 is depleted regardless of whether the brake control is in operation or out of operation. However, the internal fluid pool chamber 43 has a predetermined volume, and therefore can continue supplying the brake fluid to the pump 24 with use of the brake fluid stored in the internal fluid pool chamber 43 even when being unable to receive the supply of the brake fluid. The brake fluid transmitted from the pump 24 to the wheel cylinders 3 flows from the pressure reduction fluid passage 47 to the return flow fluid passage 17 and is returned to the internal fluid pool chamber 43 after the wheel cylinder hydraulic pressure control is ended. Therefore, even when the brake fluid becomes unable to be supplied from the suction tank chamber 101, this does not immediately lead to insufficiency of the brake fluid and introduction of air into the fluid passages. Further, the brake fluid does not flow off in both the P system and the S system. The reduction in the fluid level of the brake fluid in the reservoir tank 9 is detected based on the signal of the fluid level switch 104, and triggers the brake control processing procedures illustrated in FIGS. 3 and 4. The first control unit 18 transmits the pedal stroke determined based on the signal output from the stroke sensor 12 to the second control unit 19, and the second control unit 19 performs the wheel cylinder hydraulic pressure control based on the received pedal stroke. As a result, the pressures in all the wheel cylinders 3a to 3d can be increased with use of the brake fluid remaining in both the P and S systems.

Next, as the speed at which the brake fluid leaks outward, various speeds are possible according to the situation of the failure. A situation that the pipe is completely broken and the brake fluid leaks at a high speed does not frequently occur although being possible under a condition that the vehicle is in inappropriate use. Rather, a situation that the brake fluid flows off at a low speed due to the deterioration of a component, the insufficiency of the torque of fastening the joint at the time of the work, or the like should be taken into consideration. In this case, the opening diameter of the outflow portion is extremely small and the leak exerts only negligible influence on the normal wheel cylinder hydraulic pressure control due to the viscosity of the brake liquid fluid. Therefore, when the brake fluid flows off at a low speed, the normal wheel cylinder hydraulic pressure control can be performed but the reduction in the fluid level of the brake fluid in the reservoir tank 9 gradually progresses as time goes by or according to an increase in the number of times of braking. In the following description, the wheel cylinder hydraulic pressure control when a slight fluid leak has occurred will be described.

Figure 5:
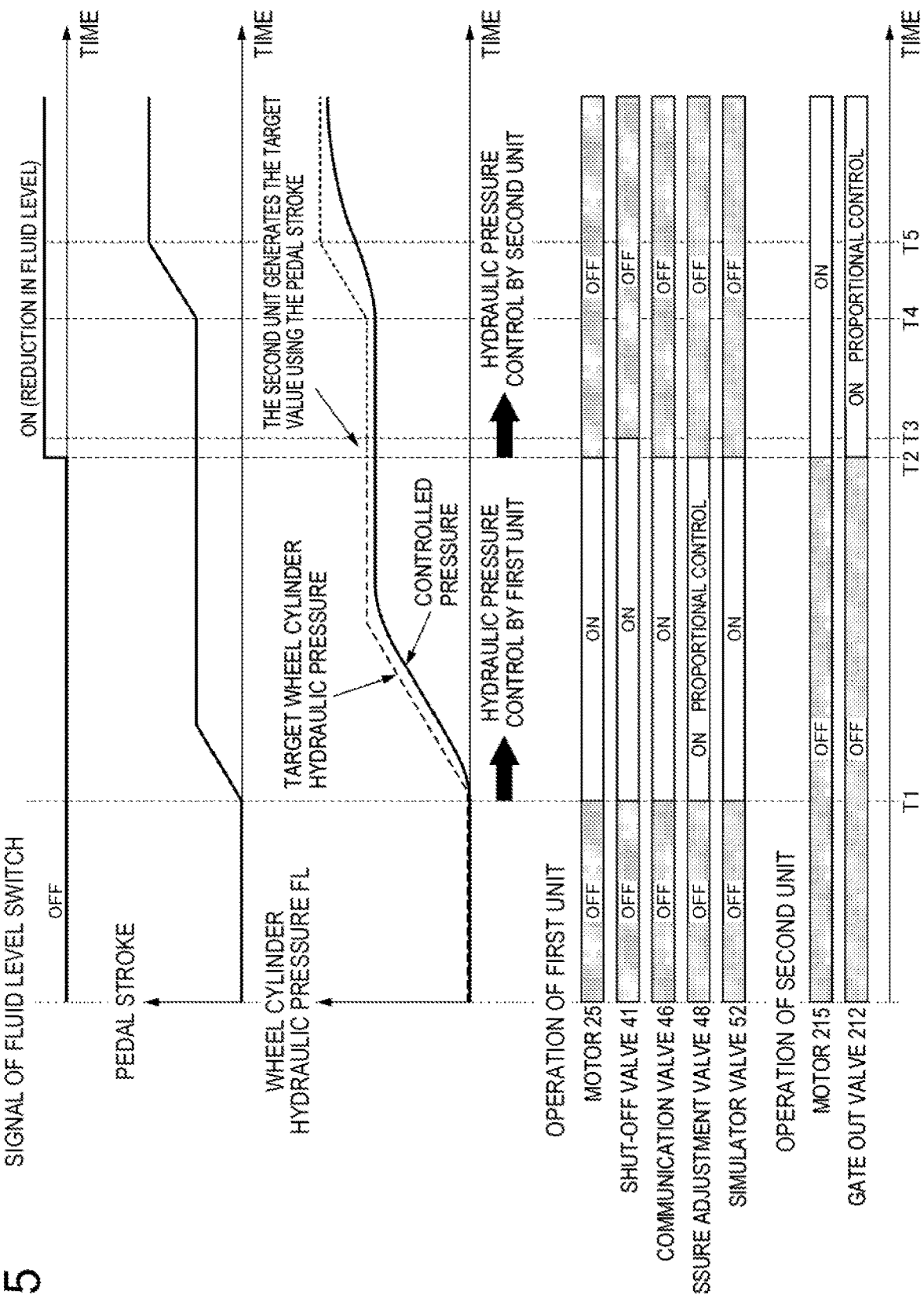
FIG. 5 is a timing chart illustrating one example of wheel cylinder hydraulic pressure control when a slight fluid leak has occurred and a reduction in the fluid level of brake fluid stored in a reservoir tank 9 is detected during the wheel cylinder hydraulic pressure control.

FIG. 5 is a timing chart illustrating one example of the wheel cylinder hydraulic pressure control when a slight fluid leak has occurred and a reduction in the fluid level of the brake fluid stored in the reservoir tank 9 is detected during the wheel cylinder hydraulic pressure control. In FIG. 5, the horizontal axes represent time, and the vertical axes represent the signal of the fluid level switch 104, the pedal stroke, the wheel cylinder hydraulic pressure (the front left wheel FL on behalf of the four wheels), the ON/OFF state of each of the actuators in the first unit 6, and the ON/OFF state of each of the actuators in the second unit 7 from the top in this order, respectively. The ON state and the OFF state of the actuator mean that electric power is supplied and electric power is not supplied, respectively.

At time T1, the driver performs the brake operation, and the pedal stroke is generated. The first unit 6 calculates the target wheel cylinder hydraulic pressure according to the pedal stroke. When the target wheel cylinder hydraulic pressure is generated, each of the actuators in the first unit is actuated. More specifically, at the same time that the motor 25 is turned on and the pump 24 is driven, the shut-off valves 41 are switched on (closed), the communication valves 46 are switched on (opened), the simulator valve 52 is switched on (opened), and the pressure adjustment valve 48 is switched on (proportionally controlled). The hydraulic pressure control is achieved by feeding back the controlled hydraulic pressure using the hydraulic pressure sensor 27 and adjusting the opening degree of the pressure adjustment valve 48. At this time, the outward leak amount is extremely small, and the controlled hydraulic pressure can be achieved without being affected by the leak.

At time T2, the fluid level sensor signal is switched on (a reduction in the fluid level). Due to the continuation of the slight leak, the fluid level in the reservoir tank 9 gradually reduces and the reduction in the fluid level is detected at the timing of T2, and therefore the brake control is switched from the normal brake control to the brake control applied when the fluid level reduces. As a result, the unit in charge of the hydraulic pressure control is switched from the first unit 6 to the second unit 7. Therefore, the second unit calculates the target wheel cylinder hydraulic pressure. At this time, the pedal stroke that the second unit 7 uses is input via the CAN. As a result, the calculation of the target wheel cylinder hydraulic pressure is switched to the second unit 7 but the value thereof is not changed between before and after time T2. The pedal stroke is communicated from the first unit 6 to the second unit 7 in the first embodiment, but a similar result can also be yielded in a case where the first unit 6 calculates the target wheel cylinder hydraulic pressure according to the pedal stroke therein and transmits the target wheel cylinder hydraulic pressure to the second unit 7.

At time T2, the first unit 6 stops the motor 25 and each of the electromagnetic valves to switch the unit in charge of the hydraulic pressure control from the first unit 6 to the second unit 7. At the same time, the second unit 7 turns on the motor 215 thereof to actuate the pumps 214P and 214S and also switches on (proportionally controls) the gate valves 212. The second unit 7 realizes the wheel cylinder hydraulic pressure control by proportionally controlling the gate valves 212 in such a manner that the wheel cylinder hydraulic pressure estimated based on the number of rotations of the motor 215 matches the target wheel cylinder hydraulic pressure.

At this time, the shut-off valves 41 are kept switched on at the point of time T2, and are switched off at time T3. Because the brake fluid is supplied to the wheel cylinders 3 at the point of time T2, opening the shut-off valves 41 would unintentionally cause a backward flow of the brake fluid as far as the master cylinder 2 and a return of the brake pedal 4. This can be prevented by opening the shut-off valves 41 after securing a time required to reliably close the gate valves 212 in the second unit 7.

At times T4 to T5, the driver further additionally presses the brake pedal 4 and increases the pedal stroke, but the wheel cylinder hydraulic pressure follows the target wheel cylinder hydraulic pressure due to the second unit 7. A warning is issued to the driver with use of the warning lamp of the meter or the like when the fluid level of the brake fluid reduces in the reservoir tank 9 although this is not illustrated.

As time further advances, the brake fluid entirely flows off outward in the system where the leak has occurred and makes it impossible to generate the hydraulic pressure in the P system or the S system, but the brake fluid does not flow off in the normal system where no outward leak has occurred, thereby allowing the hydraulic pressure control to continue. Therefore, even when the reduction in the fluid level of the brake fluid in the reservoir tank 9 is detected during the braking under the situation that the slight leak has occurred, the control mode can be reliably switched from the normal brake control to the brake control applied when the fluid level reduces, which can ensure that the braking force is generated in at least one of the P system and the S system even after time has elapsed.

The detection of a reduction in the fluid level of the brake fluid in the reservoir tank 9 is not limited only to when a fluid leak has occurred, and a reduction in the fluid level may also be detected, for example, when a failure has occurred in the fluid level switch 104 or when the brake pad is worn. Then, the brake control apparatus 1 operates in a similar manner to the operation in FIG. 5 in this case. Even when the brake control is switched from the normal brake control to the brake control applied when the fluid level reduces although no fluid leak has occurred, the hydraulic pressure control by the second unit 7 continues, and therefore the braking force can be generated on all of the wheels FL to RR.

The brake control apparatus 1 according to the first embodiment brings about the following advantageous effects.

The second control unit 19 controls the pump 214P of the P system and the pump 214S of the S pump according to the pedal stroke detected by the stroke sensor 12 if the fluid level of the brake fluid in the reservoir tank 9 is brought into a state lower than a predetermined fluid surface level during the normal brake control and the brake control transitions to the brake control applied when the fluid level reduces. The second connection fluid passage 211P of the P system and the second connection fluid passage 211S of the S system are independent of each other in the second hydraulic pressure unit 106. Therefore, even when an outward leak has occurred in one of the systems, with use of the brake fluid remaining in the other of the brake systems, the pressures in the wheel cylinders 3 of this brake system can be increased. Therefore, even when an outward leak of the brake fluid has occurred in one of the systems, the braking force can be secured by the remaining system regardless of the portion where the outward leak has occurred.

The second control unit 19 acquires the pedal stroke via the first control unit 18 when determining that the brake control applied when the fluid level reduces is necessary. This configuration allows the electric wire connecting the second control unit 19 and the stroke sensor 12 to be omitted, thereby being able to minimize the number of connections of electric wires in the stroke sensor 12 and achieve simple construction of the system.

When determining that the fluid level of the brake fluid stored in the reservoir tank 9 reduces, the first control unit 18 de-actuates the pump 24 after outputting the pedal stroke to the second control unit 19. In other words, the first control unit 18 de-actuates the pump 24 after the second control unit 19 acquires the pedal stroke. More specifically, the first control unit 18 de-actuates the pump 24 after the second control unit 19 is brought into a state ready for the wheel cylinder hydraulic pressure control according to the pedal stroke, thereby allowing the wheel cylinder hydraulic pressure control to continue according to the pedal stroke even after the transition from the normal brake control to the brake control applied when the fluid level reduces.

When the brake control transitions from the normal brake control to the brake control applied when the fluid level reduces, the first control unit 18 actuates the shut-off valve 41P of the P system and the shut-off valve 41S of the S system in the valve-opening directions after the second control unit 19 drives the pump 214P of the P system and the pump 214S of the S system and actuates the gate valve 212P of the P system and the gate valve 212S of the S system in the valve-closing directions. Hypothetically supposing that the gate valves 212 are actuated in the valve-closing directions after the shut-off valves 41 are actuated in the valve-opening directions at this time, the brake fluid supplied to the wheel cylinders 3 would flow backward as far as the master cylinder 2 and cause the brake pedal 4 to be returned, which might make the driver feel uncomfortable. Therefore, the return of the brake pedal 4 can be prevented by actuating the shut-off valves 41 in the valve-opening directions after actuating the gate valves 212 in the valve-closing directions.

The reservoir tank 9 is partitioned into the primary tank chamber 100P connected to the primary chamber 16P, the secondary tank chamber 100S connected to the secondary chamber 16S, and the suction tank chamber 101 connected to the intake portion of the pump 24. Due to this configuration, the brake control apparatus 1 can avoid an outward outflow of the brake fluid at least in one of the systems regardless of the portion where the outward leak of the brake fluid has occurred, thereby securing the braking force by the one of the systems.

The second hydraulic pressure unit 106 includes the hydraulic pressure sensor 208 in the second connection fluid passage 211P of the P system, and the second control unit 19 controls the pump 214P of the P system and the pump 214S of the S system according to the brake operation amount determined based on the value detected by the hydraulic pressure sensor 208 when acquiring the information regarding an abnormality in the first unit 6 that is output from the first control unit 18. Due to this configuration, the braking force can be reliably secured by performing the backup control with use of the second unit 7 when an abnormality has occurred in the first unit 6. Further, even when the second unit 7 cannot receive the pedal stroke due to the abnormality in the first unit 6, the wheel cylinder hydraulic pressure control according to the amount of the driver's brake operation can be performed.

The first control unit 18 determines the state that the fluid level of the brake fluid in the reservoir tank 9 falls below the predetermined fluid surface level based on the signal output from the fluid level switch 104 mounted in the reservoir tank 9. Therefore, a reduction in the fluid level can be accurately determined by using the fluid level switch 104.

Second Embodiment

A second embodiment has a basic configuration similar to the first embodiment, and therefore will be described focusing only on differences from the first embodiment.

Figure 6:
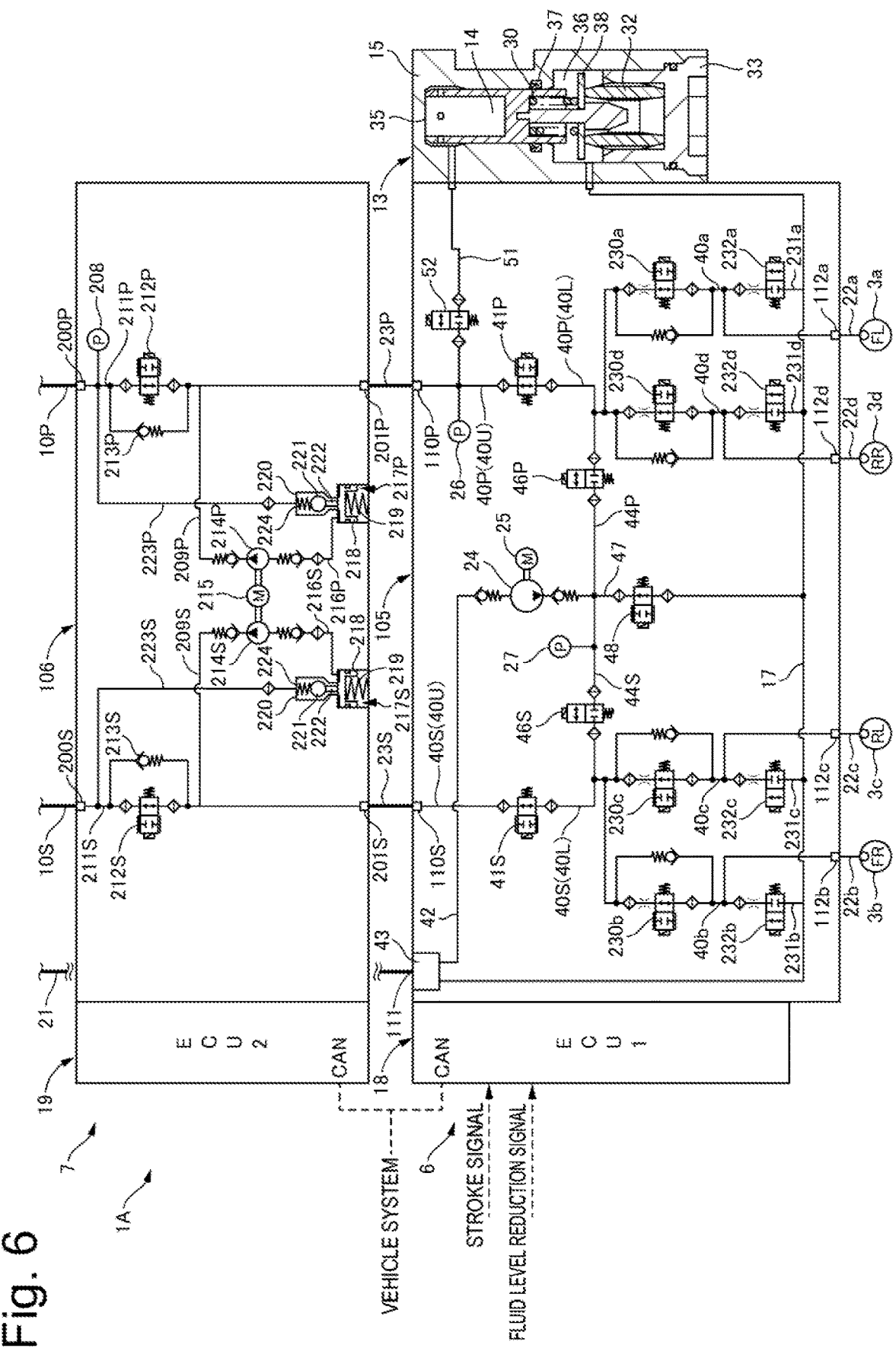
FIG. 6 illustrates the configurations of the first unit 6 and the second unit 7 in a brake control apparatus 1A according to a second embodiment.

FIG. 6 illustrates the configurations of the first unit 6 and the second unit 7 in a brake control apparatus 1A according to the second embodiment.

The first hydraulic pressure unit 105 includes the first input ports 110 and the first output ports 112. The first input ports 110 are connected to the unit connection pipes 23. The first output ports 112 are connected to the wheel cylinder pipes 22.

The second pressure unit 106 includes the second input ports 200 and the second output ports 201. The second input ports 200 are connected to the master cylinder pipes 10. The second output ports 201 are connected to the unit connection pipes 23.

The first hydraulic pressure unit 105 includes pressure increase valves 230 and pressure reduction valves 232 in addition to the pump 24, the shut-off valves 41, the communication valves 46, the pressure adjustment valve 48, and the simulator valve 52. In the first hydraulic pressure unit 105, the downstream-side flow passage 40L of the first connection fluid passage 40P of the P system branches into the first connection flow passage 44a of the front left wheel FL and the first connection flow passage 44d of the rear right wheel RR. The downstream-side flow passage 40L of the first connection fluid passage 40S of the S system branches into the first connection flow passage 40b of the front right wheel FR and the first connection flow passage 40c of the rear left wheel RL. The pressure increase valves 230a to 230d are provided in the second connection fluid passages 40a to 40d, respectively. Further, pressure reduction fluid passages 231a to 231d are connected to the first output port 112a to 112d sides of the first connection fluid passages 40a to 40d with respect to the pressure increase valves 230a to 230d, respectively. The pressure reduction valves 232 are provided in the pressure reduction fluid passages 231. The pressure reduction fluid passages 231 are connected to the return flow fluid passage 17. The first hydraulic pressure unit 105 can increase, reduce, and maintain the hydraulic pressure in each of the wheel cylinders 3 individually by putting the pressure increase valve 230 and the pressure reduction valve 232 in operation. In other words, the first hydraulic pressure unit 105 is a unit that integrates all of the deceleration according to the driver's brake operation, the autonomous brake deceleration, and the pressure adjustment at each of the wheels FL to RR for controlling the vehicle behavior.

On the other hand, the second hydraulic pressure unit 106 includes the gate valves 212, the pumps 214, and the reservoir 217. The second hydraulic pressure unit 106 functions as a redundant hydraulic pressure source for the first hydraulic pressure unit 105, and the main role thereof is a backup function actuated when a failure has occurred in the first hydraulic pressure unit 105.

The brake control processing procedures by the first control unit 18 and the second control unit 19 are similar to the brake control processing procedures according to the first embodiment illustrated in FIGS. 3 and 4, and therefore the descriptions thereof will be omitted here.

The brake control apparatus 1A according to the second embodiment brings about advantageous effects similar to the brake control apparatus 1 according to the first embodiment.

Third Embodiment

A third embodiment has a basic configuration similar to the first embodiment, and therefore will be described focusing only on differences from the first embodiment.

Figure 7:
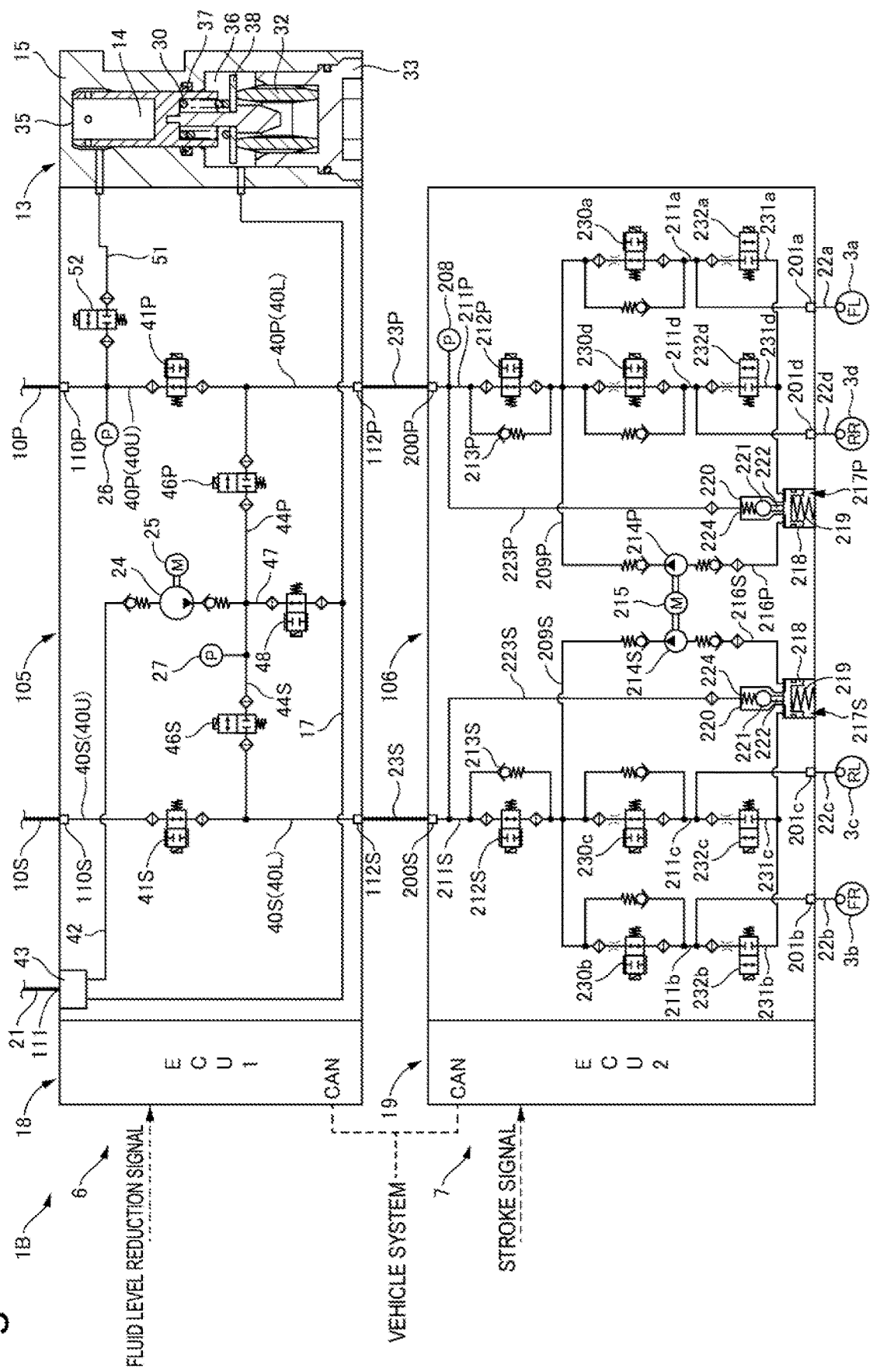
FIG. 7 illustrates the configurations of the first unit 6 and the second unit 7 in a brake control apparatus 1B according to a third embodiment.

FIG. 7 illustrates the configurations of the first unit 6 and the second unit 7 in a brake control apparatus 1B according to the third embodiment.

The signal of the stroke sensor 12 is input to the second control unit 19. In other words, the second control unit 19 is connected to the stroke sensor 12 via a dedicated electric wire.

Figure 8:
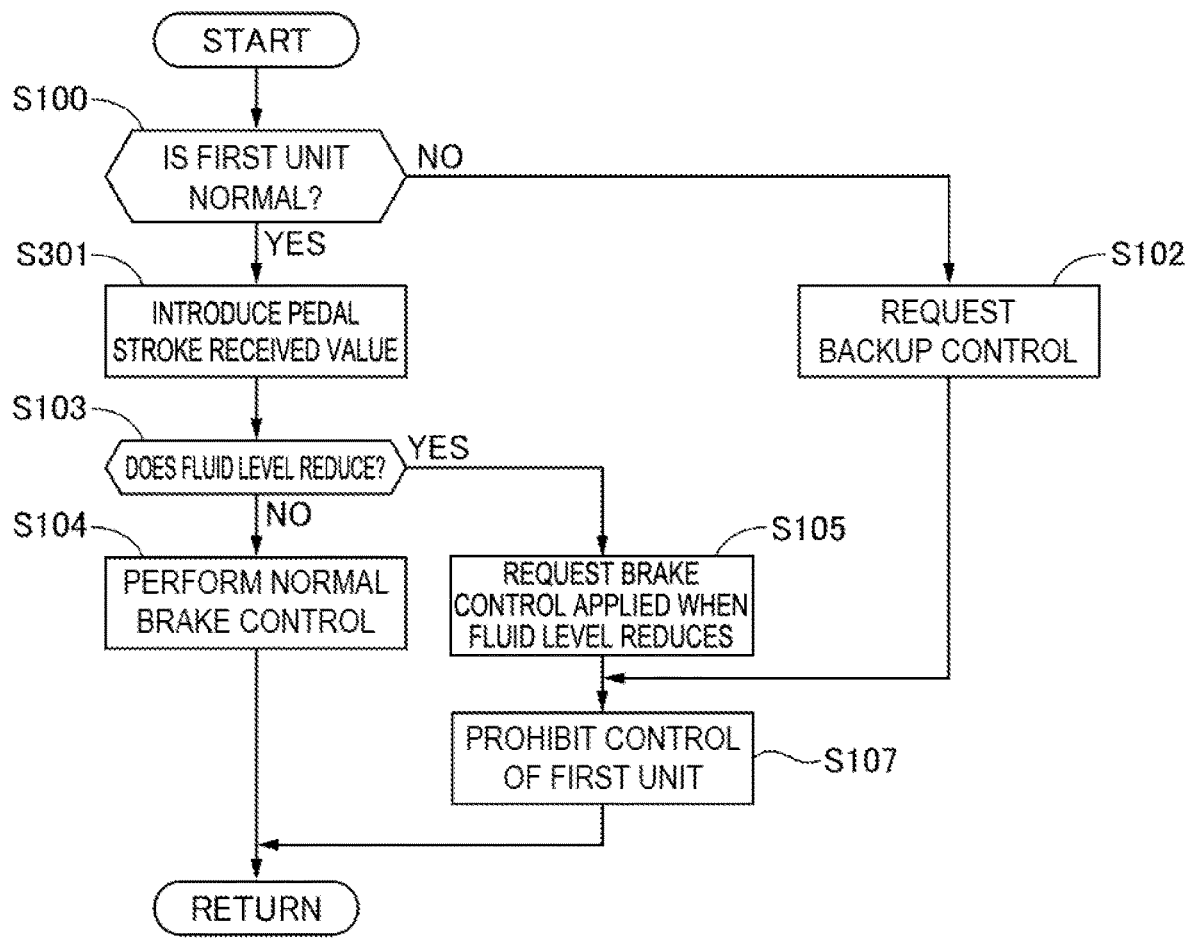
FIG. 8 is a flowchart illustrating a flow of brake control processing by the first control unit 18 according to the third embodiment.
Figure 9:
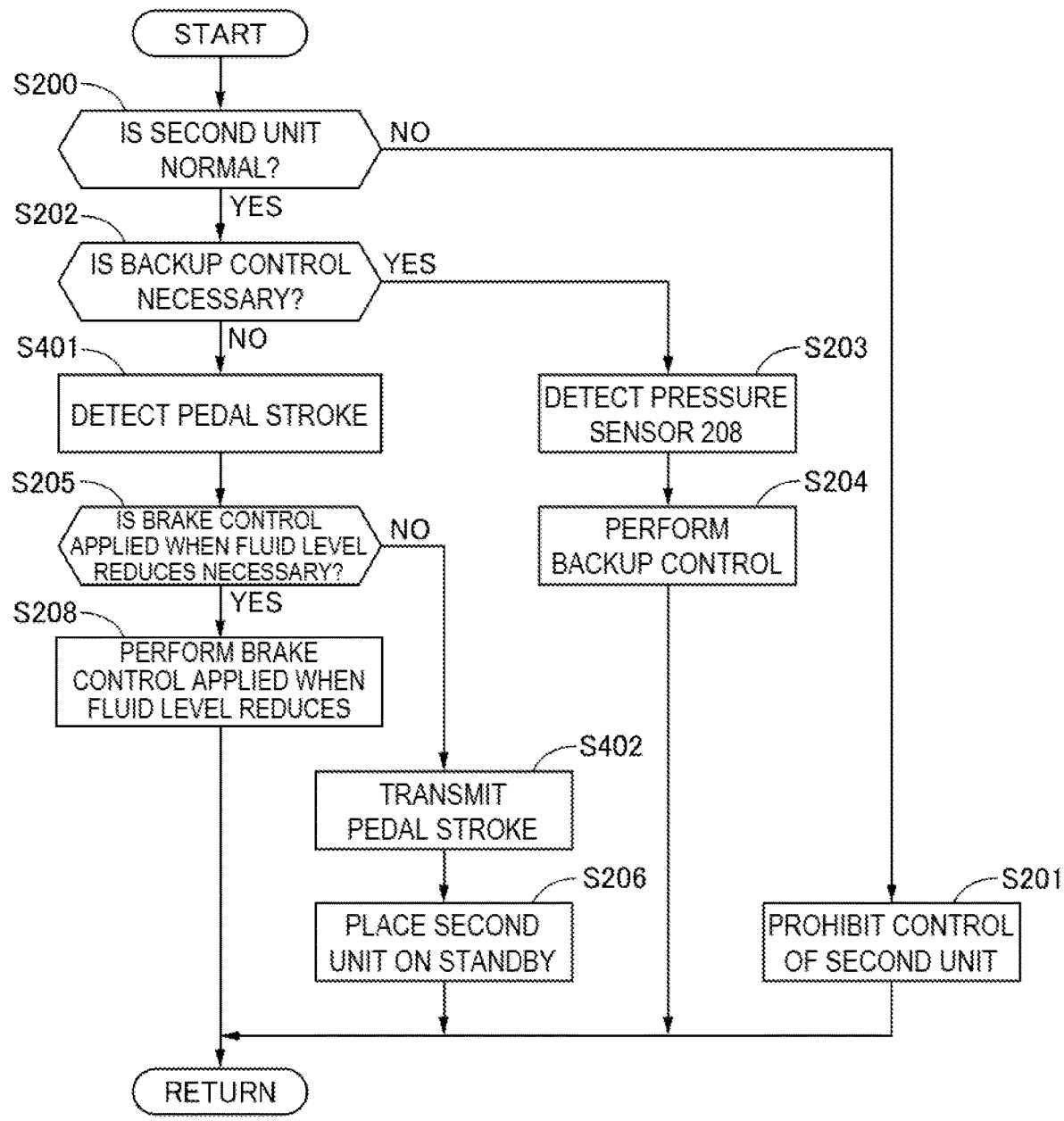
FIG. 9 is a flowchart illustrating a flow of brake control processing by the second control unit 19 according to the third embodiment.

FIG. 8 is a flowchart illustrating a flow of brake control processing by the first control unit 18 according to the third embodiment, and FIG. 9 is a flowchart illustrating a flow of brake control processing by the second control unit 19 according to the third embodiment. Steps in which processing similar to the respective steps illustrated in FIG. 3 or 4 is performed will be identified by the same step numbers, and the descriptions thereof will be omitted here.

In FIG. 8, in step S301, the first control unit 18 introduces the pedal stroke received value received from the second control unit 19 via the CAN.

In FIG. 9, in step S401, the second control unit 19 detects the pedal stroke based on the value detected by the stroke sensor 12.

In step S402, the second control unit 19 transmits the pedal stroke to the first control unit 18 via the CAN.

The brake control apparatus 1B according to the third embodiment brings about advantageous effects similar to the brake control apparatus 1 according to the first embodiment.

Fourth Embodiment

A fourth embodiment is different from the first embodiment only in terms of the processing in step S107 in the flowchart illustrated in FIG. 3.

In step S107, the first control unit 18 prohibits the control of the first unit 6 but actuates only the simulator valve 52 in the valve-opening direction. In other words, in the fourth embodiment, the simulator valve 52 is kept in the valve-opened state when the brake control transitions from the normal brake control to the brake control applied when the fluid level reduces due to a reduction in the fluid level of the brake fluid in the reservoir tank 9. As a result, the stroke simulator 13 is actuated according to the driver's brake operation, whereby the pedal stroke can be stably secured.

Other advantageous effects are similar to the first embodiment, and therefore the descriptions thereof will be omitted here.

OTHER EMBODIMENTS

Having described the embodiments for implementing the present invention, the specific configuration of the present invention is not limited to the configurations of the embodiments, and the present invention also includes even a design modification and the like thereof made within a range that does not depart from the spirit of the present invention, if any.

The check valves 220 of the reservoirs 217 are embodied by mechanical valves in the embodiments, but may be electromagnetic valves. A similar operation can be achieved by providing normally-closed electromagnetic valves on the way of the intake connection fluid passages 223 and actuating the electromagnetic valves in the valve-opening directions when actuating the pumps 214.

The brake control apparatus detects the state that the fluid level of the brake fluid in the reservoir tank 9 falls below the predetermined level with use of the fluid level switch 104 in the embodiments, but may detect the state that the fluid level falls below the predetermined level by identifying the state of the system caused by the state that the fluid level falls below the predetermined level. In FIG. 1, the brake fluid amount discharged by the pump 24 of the first unit 6 can be estimated by integrating the product of the number of rotations of the motor 25 and the pump inherent discharge amount (the fluid amount per rotation) over time, and the brake fluid amount discharged by the pump 24 and the wheel cylinder hydraulic pressure are correlated to each other. Therefore, for example, a leak in the suction hose 21, i.e., the cause for a reduction in the fluid surface level can be estimated by comparing the wheel cylinder hydraulic pressure estimated based on the number of rotations of the motor 25 and the value detected by the hydraulic pressure sensor 27.

The hydraulic pressure sensor 26 may be provided in the first connection fluid passage 40S (the upstream-side fluid passage 40U) of the S system. Further, the hydraulic pressure sensor 208 may be provided on the second input port 200S side of the second connection fluid passage 211S of the S system with respect to the gate valve 212S.

In the following description, technical ideas recognizable from the above-described embodiments will be described.

A brake control apparatus, in one configuration thereof, includes a first hydraulic pressure unit and a second hydraulic pressure unit. The first hydraulic pressure unit includes a primary-system first input port connected to a first chamber of a master cylinder, a secondary-system first input port connected to a second chamber of the master cylinder, a primary-system first connection fluid passage connected to the primary-system first input port, a secondary-system first connection fluid passage connected to the secondary-system first input port, a first hydraulic pressure source configured to discharge brake fluid to the primary-system first connection fluid passage and the secondary-system first connection fluid passage, a primary-system first output port connected to the primary-system first connection fluid passage, a secondary-system first output port connected to the secondary-system first connection fluid passage, and a first control unit configured to control the first hydraulic pressure source according to a physical amount regarding an operation amount of a brake pedal that is detected by a brake operation amount detection portion configured to detect the physical amount regarding the operation amount of the brake pedal. The second hydraulic pressure unit includes a primary-system second input port connected to the primary-system first output port, a secondary-system second input port connected to the secondary-system first output port, a primary-system second connection fluid passage connected to the primary-system second input port, a secondary-system second connection fluid passage connected to the secondary-system second input port, a primary-system second hydraulic pressure source configured to discharge the brake fluid to the primary-system second connection fluid passage, a secondary-system second hydraulic pressure source configured to discharge the brake fluid to the secondary-system second connection fluid passage, a primary-system second output port connecting the primary-system second connection fluid passage and a first braking force application portion configured to apply a braking force to a wheel of a primary system according to a brake hydraulic pressure, a secondary-system second output port connecting the secondary-system second connection fluid passage and a second braking force application portion configured to apply a braking force to a wheel of a secondary system according to a brake hydraulic pressure, and a second control unit configured to control the primary-system second hydraulic pressure source and the secondary-system second hydraulic pressure source according to the physical amount regarding the operation amount of the brake pedal that is detected by the brake operation amount detection portion in a state that a fluid level of the brake fluid in a reservoir tank falls below a predetermined fluid surface level.

Preferably, in the above-described configuration, the second control unit acquires the physical amount regarding the operation amount of the brake pedal via the first control unit.

According to another preferable configuration, in any of the above-described configurations, the first control unit de-actuates the first hydraulic pressure source after outputting the physical amount regarding the operation amount of the brake pedal to the second control unit.

According to further another preferable configuration, in any of the above-described configurations, the first hydraulic pressure unit further includes a primary-system shut-off valve provided in the primary-system first connection fluid passage, a secondary-system shut-off valve provided in the secondary-system first connection fluid passage, a primary-system first discharge fluid passage connected to a portion of the primary-system first connection fluid passage that is located between the primary-system shut-off valve and the primary-system first output port and configured to receive the brake fluid discharged from the first hydraulic pressure source thereto, and a secondary-system first discharge fluid passage connected to a portion of the secondary-system first connection fluid passage that is located between the secondary-system shut-off valve and the secondary-system first output port and configured to receive the brake fluid discharged from the first hydraulic pressure source thereto. The second hydraulic pressure unit further includes a primary-system gate valve provided in the primary-system second connection fluid passage, a secondary-system gate valve provided in the secondary-system second connection fluid passage, a primary-system second discharge fluid passage connected to a portion of the primary-system second connection fluid passage that is located between the primary-system gate valve and the primary-system second output port and configured to receive the brake fluid discharged from the primary-system second hydraulic pressure source thereto, and a secondary-system second discharge fluid passage connected to a portion of the secondary-system second connection fluid passage that is located between the secondary-system gate valve and the secondary-system second output port and configured to receive the brake fluid discharged from the secondary-system second hydraulic pressure source thereto. After the second control unit drives the primary-system second hydraulic pressure source and the secondary-system second hydraulic pressure source and actuates the primary-system gate valve and the secondary-system gate valve in valve-closing directions, the first control unit actuates the primary-system shut-off valve and the secondary-system shut-off valve in valve-opening directions.

According to further another preferable configuration, in any of the above-described configurations, the reservoir tank is partitioned into a first storage chamber connected to the first chamber, a second storage chamber connected to the second chamber, and a third storage chamber connected to an intake portion of the first hydraulic pressure source.

According to further another preferable configuration, in any of the above-described configurations, after the second control unit acquires the physical amount regarding the operation amount of the brake pedal, the first control unit de-actuates the first hydraulic pressure source.

According to further another preferable configuration, in any of the above-described configurations, the brake control apparatus further includes a stroke simulator partitioned into a positive pressure chamber and a backpressure chamber by a piston, a simulator fluid passage connecting the positive pressure chamber and the master cylinder, and a simulator valve provided in the simulator fluid passage. After the second control unit acquires the physical amount regarding the operation amount of the brake pedal, the first control unit de-actuates the first hydraulic pressure source and actuates the simulator valve in a valve-opening direction.

According to further another preferable configuration, in any of the above-described configurations, the second hydraulic pressure unit further includes a hydraulic pressure sensor in the primary-system second connection fluid passage. In a case where the second control unit acquires information regarding an abnormality in the first control unit or an abnormality in the first hydraulic pressure unit that is output from the first control unit, the second control unit controls the primary-system second hydraulic pressure source and the secondary-system second hydraulic pressure source according to a physical amount regarding a hydraulic pressure of the brake fluid that is detected by the hydraulic pressure sensor.

According to further another preferable configuration, in any of the above-described configurations, the state that the fluid level of the brake fluid falls below the predetermined fluid surface level is determined based on a signal output from a fluid level detection portion mounted in the reservoir tank.

Further, from another aspect, a brake control apparatus includes a first hydraulic pressure unit and a second hydraulic pressure unit. The first hydraulic pressure unit includes a primary-system first output port connected to a first braking force application portion configured to apply a braking force to a wheel of a primary system according to a brake hydraulic pressure, a secondary-system first output port connected to a second braking force application portion configured to apply a braking force to a wheel of a secondary system according to a brake hydraulic pressure, a primary-system first connection fluid passage connected to the primary-system first output port, a secondary-system first connection fluid passage connected to the secondary-system first output port, a first hydraulic pressure source configured to discharge brake fluid to the primary-system first connection fluid passage and the secondary-system first connection fluid passage, a primary-system first input port connected to the primary-system first connection fluid passage, a secondary-system first input port connected to the secondary-system first connection fluid passage, and a first control unit configured to control the first hydraulic pressure source according to a physical amount regarding an operation amount of a brake pedal that is detected by a brake operation amount detection portion configured to detect the physical amount regarding the operation amount of the brake pedal. The second hydraulic pressure unit includes a primary-system second output port connected to the primary-system first input port, a secondary-system second output port connected to the secondary-system first input port, a primary-system second connection fluid passage connected to the primary-system second output port, a secondary-system second connection fluid passage connected to the secondary-system second output port, a primary-system second hydraulic pressure source configured to discharge the brake fluid to the primary-system second connection fluid passage, a secondary-system second hydraulic pressure source configured to discharge the brake fluid to the secondary-system second connection fluid passage, a primary-system second input port connected to the primary-system second connection fluid passage and a first chamber in a master cylinder, a secondary-system second input port connected to the secondary-system second connection fluid passage and a second chamber in the master cylinder, and a second control unit configured to control the primary-system second hydraulic pressure source and the secondary-system second hydraulic pressure source according to the physical amount regarding the operation amount of the brake pedal that is detected by the brake operation amount detection portion in a state that a fluid level of the brake fluid in a reservoir tank falls below a predetermined fluid surface level.

Preferably, in the above-described configuration, the second control unit acquires the physical amount regarding the operation amount of the brake pedal via the first control unit.

According to another preferable configuration, in any of the above-described configurations, the first control unit de-actuates the first hydraulic pressure source after outputting the physical amount regarding the operation amount of the brake pedal to the second control unit.

According to further another preferable configuration, in any of the above-described configurations, the state that the fluid level of the brake fluid falls below the predetermined fluid surface level is determined based on a signal output from a fluid level detection portion mounted in the reservoir tank.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-110175 filed on Jun. 13, 2019. The entire disclosure of Japanese Patent Application No. 2019-110175 filed on Jun. 13, 2019 including the specification, the claims, the drawings, and the abstract is incorporated herein by reference in its entirety.

REFERENCE SIGNS LIST 1 brake control apparatus
2 master cylinder
3 wheel cylinder
4 brake pedal
5 master cylinder unit
6 first unit
7 second unit
9 reservoir tank
12 stroke sensor
13 stroke simulator
14 simulator piston
16P primary chamber (first chamber)
16S secondary chamber (second chamber)
18 first control unit
19 second control unit
24 pump (first hydraulic pressure source)
35 positive pressure chamber
36 backpressure chamber
40P first connection fluid passage (primary-system first connection fluid passage)
40S first connection fluid passage (secondary-system first connection fluid passage)
41P shut-off valve (primary-system shut-off valve)
41S shut-off valve (secondary-system shut-off valve)
44P communication fluid passage (primary-system first discharge fluid passage)
44S communication fluid passage (secondary-system first discharge fluid passage)
51 simulator fluid passage
52 simulator valve
100P primary tank chamber (first storage chamber)
100S secondary tank chamber (second storage chamber)
101 suction tank chamber (third storage chamber)
104 fluid level switch (fluid level detection portion)
105 first hydraulic pressure unit
106 second hydraulic pressure unit
110P first input port (primary-system first input port)
110S first input port (secondary-system first input port)
112P first output port (primary-system first output port)
112S first output port (secondary-system first output port)
200P second input port (primary-system second input port)
200S second input port (secondary-system second input port)
201a second output port (primary-system second output port)
201b second output port (secondary-system second output port)
201c second output port (secondary-system second output port)
201d second output port (primary-system second output port)
208 hydraulic pressure sensor
209P discharge fluid passage (primary-system second discharge fluid passage)
209S discharge fluid passage (secondary-system second discharge fluid passage)
211P second connection fluid passage (primary-system second connection fluid passage)
211S second connection fluid passage (secondary-system second connection fluid passage)
212P gate valve (primary-system gate valve)
212S gate valve (secondary-system gate valve)
214P pump (primary-system second hydraulic pressure source)
214S pump (secondary-system second hydraulic pressure source)

The invention claimed is:

1. A brake control apparatus comprising:
a first hydraulic pressure unit; and
a second hydraulic pressure unit,
wherein the first hydraulic pressure unit includes
a primary-system first input port connected to a first chamber of a master cylinder,
a secondary-system first input port connected to a second chamber of the master cylinder,
a primary-system first connection fluid passage connected to the primary-system first input port,
a secondary-system first connection fluid passage connected to the secondary-system first input port,
a first hydraulic pressure source configured to discharge brake fluid to the primary-system first connection fluid passage and the secondary-system first connection fluid passage,
a primary-system first output port connected to the primary-system first connection fluid passage,
a secondary-system first output port connected to the secondary-system first connection fluid passage, and
a first control unit configured to control the first hydraulic pressure source according to a physical amount regarding an operation amount of a brake pedal that is detected by a brake operation amount detection portion configured to detect the physical amount regarding the operation amount of the brake pedal, and
wherein the second hydraulic pressure unit includes
a primary-system second input port connected to the primary-system first output port,
a secondary-system second input port connected to the secondary-system first output port,
a primary-system second connection fluid passage connected to the primary-system second input port,
a secondary-system second connection fluid passage connected to the secondary-system second input port,
a primary-system second hydraulic pressure source configured to discharge the brake fluid to the primary-system second connection fluid passage,
a secondary-system second hydraulic pressure source configured to discharge the brake fluid to the secondary-system second connection fluid passage,
a primary-system second output port connecting the primary-system second connection fluid passage and a first braking force application portion configured to apply a braking force to a wheel of a primary system according to a brake hydraulic pressure,
a secondary-system second output port connecting the secondary-system second connection fluid passage and a second braking force application portion configured to apply a braking force to a wheel of a secondary system according to a brake hydraulic pressure, and
a second control unit configured to control the primary-system second hydraulic pressure source and the secondary-system second hydraulic pressure source according to the physical amount regarding the operation amount of the brake pedal that is detected by the brake operation amount detection portion in a state that a fluid level of the brake fluid in a reservoir tank falls below a predetermined fluid surface level.

2. The brake control apparatus according to claim 1, wherein the second control unit acquires the physical amount regarding the operation amount of the brake pedal via the first control unit.

3. The brake control apparatus according to claim 2, wherein the first control unit de-actuates the first hydraulic pressure source after outputting the physical amount regarding the operation amount of the brake pedal to the second control unit.

4. The brake control apparatus according to claim 1, wherein the first hydraulic pressure unit further includes
a primary-system shut-off valve provided in the primary-system first connection fluid passage,
a secondary-system shut-off valve provided in the secondary-system first connection fluid passage,
a primary-system first discharge fluid passage connected to a portion of the primary-system first connection fluid passage that is located between the primary-system shut-off valve and the primary-system first output port, the primary-system first discharge fluid passage being configured to receive the brake fluid discharged from the first hydraulic pressure source thereto, and
a secondary-system first discharge fluid passage connected to a portion of the secondary-system first connection fluid passage that is located between the secondary-system shut-off valve and the secondary-system first output port, the secondary-system first discharge fluid passage being configured to receive the brake fluid discharged from the first hydraulic pressure source thereto,
wherein the second hydraulic pressure unit further includes
a primary-system gate valve provided in the primary-system second connection fluid passage,
a secondary-system gate valve provided in the secondary-system second connection fluid passage,
a primary-system second discharge fluid passage connected to a portion of the primary-system second connection fluid passage that is located between the primary-system gate valve and the primary-system second output port, the primary-system second discharge fluid passage being configured to receive the brake fluid discharged from the primary-system second hydraulic pressure source thereto, and
a secondary-system second discharge fluid passage connected to a portion of the secondary-system second connection fluid passage that is located between the secondary-system gate valve and the secondary-system second output port, the secondary-system second discharge fluid passage being configured to receive the brake fluid discharged from the secondary-system second hydraulic pressure source thereto, and
wherein, after the second control unit drives the primary-system second hydraulic pressure source and the secondary-system second hydraulic pressure source and actuates the primary-system gate valve and the secondary-system gate valve in valve-closing directions, the first control unit actuates the primary-system shut-off valve and the secondary-system shut-off valve in valve-opening directions.

5. The brake control apparatus according to claim 1, wherein the reservoir tank is partitioned into a first storage chamber connected to the first chamber, a second storage chamber connected to the second chamber, and a third storage chamber connected to an intake portion of the first hydraulic pressure source.

6. The brake control apparatus according to claim 1, wherein, after the second control unit acquires the physical amount regarding the operation amount of the brake pedal, the first control unit de-actuates the first hydraulic pressure source.

7. The brake control apparatus according to claim 1, further comprising:
a stroke simulator partitioned into a positive pressure chamber and a backpressure chamber by a piston;
a simulator fluid passage connecting the positive pressure chamber and the master cylinder; and
a simulator valve provided in the simulator fluid passage,
wherein, after the second control unit acquires the physical amount regarding the operation amount of the brake pedal, the first control unit de-actuates the first hydraulic pressure source and actuates the simulator valve in a valve-opening direction.

8. The brake control apparatus according to claim 1, wherein the second hydraulic pressure unit further includes a hydraulic pressure sensor in the primary-system second connection fluid passage, and
wherein, in a case where the second control unit acquires information regarding an abnormality in the first control unit or an abnormality in the first hydraulic pressure unit that is output from the first control unit, the second control unit controls the primary-system second hydraulic pressure source and the secondary-system second hydraulic pressure source according to a physical amount regarding a hydraulic pressure of the brake fluid that is detected by the hydraulic pressure sensor.

9. The brake control apparatus according to claim 1, wherein the state that the fluid level of the brake fluid falls below the predetermined fluid surface level is determined based on a signal output from a fluid level detection portion mounted in the reservoir tank.

10. A brake control apparatus comprising:
a first hydraulic pressure unit; and
a second hydraulic pressure unit,
wherein the first hydraulic pressure unit includes
a primary-system first output port connected to a first braking force application portion configured to apply a braking force to a wheel of a primary system according to a brake hydraulic pressure,
a secondary-system first output port connected to a second braking force application portion configured to apply a braking force to a wheel of a secondary system according to a brake hydraulic pressure,
a primary-system first connection fluid passage connected to the primary-system first output port,
a secondary-system first connection fluid passage connected to the secondary-system first output port,
a first hydraulic pressure source configured to discharge brake fluid to the primary-system first connection fluid passage and the secondary-system first connection fluid passage,
a primary-system first input port connected to the primary-system first connection fluid passage,
a secondary-system first input port connected to the secondary-system first connection fluid passage, and
a first control unit configured to control the first hydraulic pressure source according to a physical amount regarding an operation amount of a brake pedal that is detected by a brake operation amount detection portion configured to detect the physical amount regarding the operation amount of the brake pedal, and
wherein the second hydraulic pressure unit includes
a primary-system second output port connected to the primary-system first input port,
a secondary-system second output port connected to the secondary-system first input port,
a primary-system second connection fluid passage connected to the primary-system second output port, a secondary-system second connection fluid passage connected to the secondary-system second output port, a primary-system second hydraulic pressure source configured to discharge the brake fluid to the primary-system second connection fluid passage, a secondary-system second hydraulic pressure source configured to discharge the brake fluid to the secondary-system second connection fluid passage, a primary-system second input port connected to the primary-system second connection fluid passage and a first chamber in a master cylinder, a secondary-system second input port connected to the secondary-system second connection fluid passage and a second chamber in the master cylinder, and a second control unit configured to control the primary-system second hydraulic pressure source and the secondary-system second hydraulic pressure source according to the physical amount regarding the operation amount of the brake pedal that is detected by the brake operation amount detection portion in a state that a fluid level of the brake fluid in a reservoir tank falls below a predetermined fluid surface level.

11. The brake control apparatus according to claim 10, wherein the second control unit acquires the physical amount regarding the operation amount of the brake pedal via the first control unit.

12. The brake control apparatus according to claim 11, wherein the first control unit de-actuates the first hydraulic pressure source after outputting the physical amount regarding the operation amount of the brake pedal to the second control unit.

13. The brake control apparatus according to claim 10, wherein the state that the fluid level of the brake fluid falls below the predetermined fluid surface level is determined based on a signal output from a fluid level detection portion mounted in the reservoir tank.

* * * * *